United States Patent
Hirsch et al.

(10) Patent No.: US 9,457,645 B2
(45) Date of Patent: Oct. 4, 2016

(54) DEVICE FOR THE THERMAL CONNECTION OF AN ENERGY STORAGE

(75) Inventors: Stefan Hirsch, Stuttgart (DE); Achim Wiebelt, Deidesheim (DE); Caroline Schmid, Stuttgart (DE); Tobias Isermeyer, Loewenstein (DE); Marc-Thomas Eisele, München (DE)

(73) Assignee: MAHLE International GmbH, Stuttgart (DE)

(*) Notice: Subject to any disclaimer, the term of this patent is extended or adjusted under 35 U.S.C. 154(b) by 0 days.

(21) Appl. No.: 13/250,454

(22) Filed: Sep. 30, 2011

(65) Prior Publication Data

US 2012/0171543 A1 Jul. 5, 2012

Related U.S. Application Data

(63) Continuation of application No. PCT/EP2010/053870, filed on Mar. 25, 2010.

(30) Foreign Application Priority Data

Mar. 30, 2009 (DE) .................. 10 2009 014 954
Jul. 28, 2009 (DE) .................. 10 2009 035 088

(51) Int. Cl.
*H01M 10/6554* (2014.01)
*B60K 1/04* (2006.01)
(Continued)

(52) U.S. Cl.
CPC .............. *B60K 1/04* (2013.01); *B60L 11/1874* (2013.01); *H01M 10/0413* (2013.01);
(Continued)

(58) Field of Classification Search
CPC ........ H01M 10/50; H01M 10/60; F28F 1/10; F28F 7/00; F28F 3/00; F28F 9/00; F28F 13/00; F28F 2215/00; H05K 7/20

USPC ........... 429/120–347; 165/181, 185; 361/704
See application file for complete search history.

(56) References Cited

U.S. PATENT DOCUMENTS

2002/0185268 A1* 12/2002 Rauch ................ H01L 21/4878
165/185
2003/0075312 A1* 4/2003 Panek .................... F28F 13/00
165/185
(Continued)

FOREIGN PATENT DOCUMENTS

| CN | 1484339 A | 3/2004 |
|---|---|---|
| DE | 102 26 847 A1 | 10/2003 |

(Continued)

OTHER PUBLICATIONS

Mitsui et al. JP 2009-301877. Dec. 24, 2009. English machine translation by JPO.*

(Continued)

*Primary Examiner* — James Lee
(74) *Attorney, Agent, or Firm* — Muncy, Geissler, Olds & Lowe, P.C.

(57) ABSTRACT

A device for thermal connection of an energy store to a cooling plate and/or a contact element, and a cooling plate on a contact element and/or a fluid is provided. The device for thermal connection has a first region having a first heat transfer property and at least one other region having another heat transfer property, wherein the first region and the at least one other region are arranged next to one another in relation to the heat transfer surface.

11 Claims, 22 Drawing Sheets

(51) Int. Cl.
*B60L 11/18* (2006.01)
*H01M 10/04* (2006.01)
*H01M 10/647* (2014.01)
*H01M 10/6556* (2014.01)
*H01M 10/652* (2014.01)
*H01M 10/613* (2014.01)
*B60K 1/00* (2006.01)
*H01M 10/625* (2014.01)

(52) U.S. Cl.
CPC ....... *H01M 10/613* (2015.04); *H01M 10/647* (2015.04); *H01M 10/652* (2015.04); *H01M 10/6554* (2015.04); *H01M 10/6556* (2015.04); *B60K 2001/005* (2013.01); *H01M 10/625* (2015.04); *Y02T 10/7005* (2013.01); *Y02T 10/705* (2013.01)

(56) References Cited

U.S. PATENT DOCUMENTS

| | | | |
|---|---|---|---|
| 2005/0074666 A1* | 4/2005 | Kimiya et al. | 429/62 |
| 2005/0153199 A1* | 7/2005 | Yagi et al. | 429/148 |
| 2008/0038124 A1 | 2/2008 | Kuehner et al. | |
| 2008/0305388 A1 | 12/2008 | Haussmann | |
| 2009/0142653 A1* | 6/2009 | Okada et al. | 429/120 |
| 2009/0208829 A1* | 8/2009 | Howard et al. | 429/120 |
| 2009/0301700 A1 | 12/2009 | German et al. | |
| 2011/0104545 A1 | 5/2011 | Meintschel et al. | |

FOREIGN PATENT DOCUMENTS

| | | | | |
|---|---|---|---|---|
| DE | 10 2004 031 674 B3 | 8/2005 | | |
| DE | 10 2006 000 885 B3 | 8/2007 | | |
| DE | 10 2006 059 989 A1 | 6/2008 | | |
| DE | 10 2007 010 751 A1 | 8/2008 | | |
| DE | 10 2007 010 743 B3 | 9/2008 | | |
| DE | 10 2007 021 309 A1 | 11/2008 | | |
| EP | 1 011 156 A1 | 6/2000 | | |
| EP | 2 017 919 A1 | 1/2009 | | |
| EP | 2 068 390 A1 | 6/2009 | | |
| JP | 8-321329 | 12/1996 | | |
| JP | 2009-301877 | * 12/2009 | ............ H01M 10/60 | |
| WO | WO 2008/106946 A2 | 9/2008 | | |
| WO | WO 2008/106948 A1 | 9/2008 | | |
| WO | WO 2009/018941 A1 | 2/2009 | | |

OTHER PUBLICATIONS

Chinese Office Action for Chinese Application No. 201080015981.7 dated Jan. 23, 2014 with English translation.

* cited by examiner

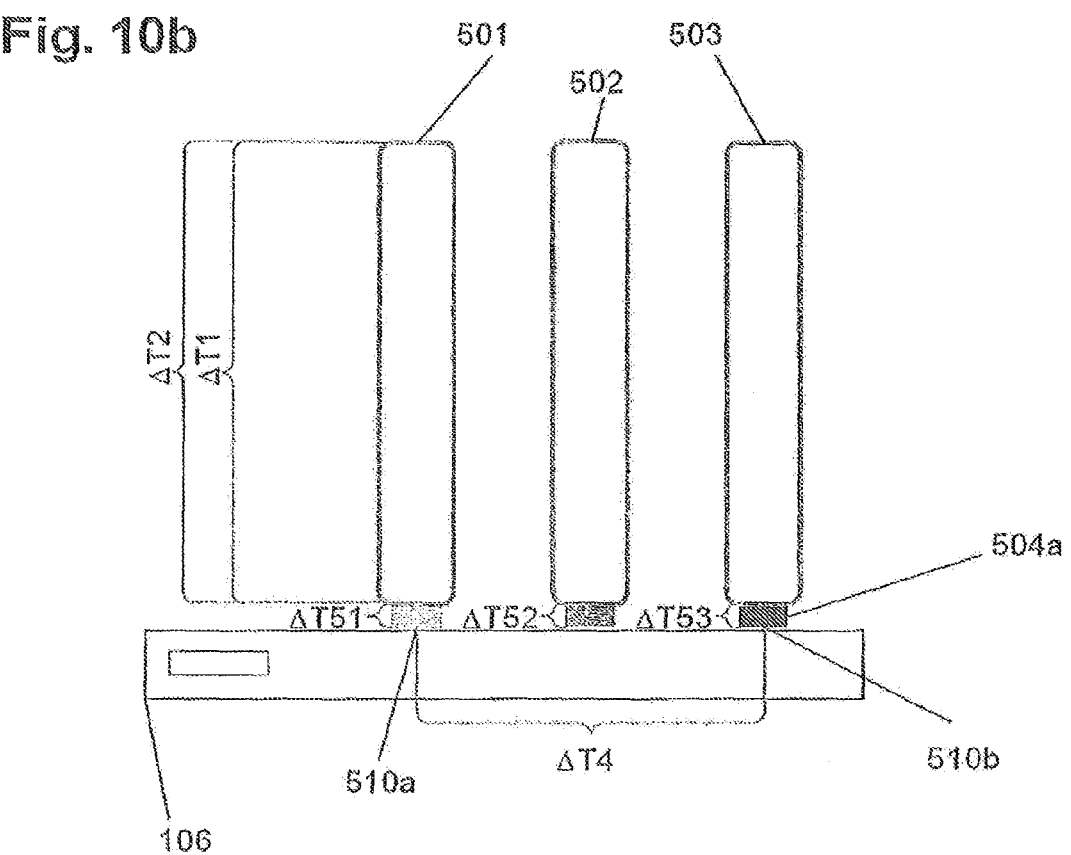

DEVICE FOR THE THERMAL CONNECTION OF AN ENERGY STORAGE

This nonprovisional application is a continuation of International Application No. PCT/EP2010/053870, which was filed on Mar. 25, 2010, and which claims priority to German Patent Application Nos. DE 10 2009 014 954.6, which was filed in Germany on Mar. 30, 2009, and to DE 10 2009 035 088.8, which was filed in Germany on Jul. 28, 2009, and which are all herein incorporated by reference.

BACKGROUND OF THE INVENTION

1. Field of the Invention

The present invention relates to a device for the thermal connection of an energy storage and/or a cooling plate a device for the thermal connection of a plurality of cooling fins to a cooling plate, to an energy storage device and to a device for the thermal connection of a fluid.

2. Description of the Background Art

Powerful energy storage devices, such as, for example Li ion or NiMH accumulator batteries or super caps, are used in modern hybrid electric vehicles (HEV) or electric vehicles (EV). Heating occurs with these during the rapid charge and discharge due to resistances in and outside the cells. Temperatures higher than 50° C. permanently damage the energy storage. In order to guarantee the function of the energy storage devices, they must be actively cooled. To this end, the energy storage devices are brought into thermal contact with a cooling plate via cooling fins.

According to the conventional art, cooling fins are attached to the cell outer surfaces in an areal single-sided or double-sided manner. The cooling fins are then brought into contact with the cooling plate. The contact surface to the cooling plate is thereby usually the same as the area of the cooling plate of thickness and length. This transition surface is the thermal bottleneck in all constructions.

Through the one-sided connection of the cooling fin to the cooling plate, a temperature difference is produced above all over the height of the cells. The temperature difference is determined by the cell waste heat and the thickness of the cooling fin or by the size of the transition surface between the cooling fin and the cooling plate. A thick cooling fin reduces the temperature difference.

The cooling fins have to be selected to be very thick particularly with high cells in connection with larger waste heats in order to be able to still maintain the permissible temperature difference in the cell. Thick cooling fins result in a low gravimetric and volumetric energy density of the cooling apparatus. In order to avoid the temperature difference over the cell height, fluid-conveying cooling fins can be attached between the cells. The temperature difference in the cells can be almost avoided thereby.

In the case of the cooling fins flowed through by fluid, disadvantages occur in the gravimetric and volumetric energy density, since due to the production possibilities and the permissible pressure loss in the overall construction, the fin thicknesses and the coolant channels cannot be selected to be as small as desired. Moreover, there is also the problem of tightness in the connections and the uniform distribution of the cooling fluid. Since each fin has to be supplied with cooling fluid, with each fin there is at least one connection that has to be sealed.

FIG. 11 shows an energy storage device according to the conventional art, in which there is a uniform heat transfer between a battery cell and a cooling fin. The energy storage device has a battery cell 102, an electrically insulating thermally conductive film 104a with a uniform contact resistance, a cooling structure 104b, which can be embodied as a heat-conducting cooling fin and a base plate with cooling, e.g., in the form of interior channels. A cell height of the battery is denoted by reference number 108. Furthermore, a base 110 of the cooling fin is shown, which represents a heat-conducting connection by adhesive force or other heat-conducting connection.

FIG. 12 shows an energy storage device according to the conventional art in which there is a uniform heat transfer between cooling fins and cooling plate. The energy storage device has a first battery cell 501, a second battery cell 502 and a third battery cell 503 as well as a cooling plate 106 with cooling, e.g., in the form of interior channels. An electrically insulating thermally conductive film 504a with a uniform contact resistance is arranged, for example, between the cooling plate 106 and the cooling structures of the respective battery cells. Furthermore, a base 110a, a "best efficiency point" 510a and a "worst efficiency point" 510b are shown by way of example.

SUMMARY OF THE INVENTION

It is therefore an object of the present invention to provide an improved device for the thermal connection of an energy storage and/or a cooling plate an improved device for the thermal connection of a plurality of cooling fins to a cooling plate, an improved energy storage device and an improved device for the thermal connection of a fluid.

This object is attained by a device for the thermal connection of an energy storage and/or a cooling plate, a device for the thermal connection of a plurality of cooling fins or a plurality of energy storage devices to a cooling plate, an energy storage device and a device for the thermal connection of a fluid.

A component of the present invention lies in the use of battery cooling elements with changeable heat transfer.

According to an embodiment of the invention, an arrangement of cooling elements, e.g., in the form of a cooling fin and one or more thermally conductive films is proposed, which have a heat transfer that is changeable over the height of the cooling fin. The maximum temperature difference on the surface of a battery cell can thus be kept as low as possible.

Furthermore, according to the same principle a changeable heat transfer between the cooling plate and attached cooling elements, for example, cooling fins, is proposed, in order to keep the temperature differences between several battery cells as low as possible.

In this manner, it is possible to uniformly cool or heat the cells integrated in the battery and to thereby keep the temperature difference in the cells as low as possible.

The fact that all of the cells are cooled uniformly, i.e., all of the cells are at the same temperature level, is important for an optimal operation of the battery. The temperature level of the cells influences the service life as well as the performance. It is also important to keep the temperature difference inside the cells, caused by the cooling, as low as possible. This can be ensured by means of the approach according to the invention.

Advantageously, a use of thick cooling fins or the use of a fluid between the cells is not necessary according to the invention in order to achieve a suitable temperature control or a minimization of a maximum temperature difference on the surface of a battery cell.

The present invention creates a device for the thermal connection of an energy storage device and/or a cooling plate, with the following features: a contact element with a heat transfer surface for providing the thermal connection, wherein the contact element has a first region with a first heat-conducting property and at least one further region with a further heat-conducting property, and wherein the first region and the at least one further region are arranged next to one another with respect to the heat transfer surface.

The thermal connection can be a physical connection to the energy storage or the cooling plate. The energy storage can be a battery or a galvanic cell, e.g., a Li ion or NiMH accumulator battery or super cap or double-layer condenser. The cooling plate can be embodied to accommodate a combination of energy cells. The cooling plate can have an interior channel for a coolant. An equalization of temperature differences can be targeted and achieved by means of the thermal connection. To this end, the contact element can be connected via the heat transfer surface to a corresponding contact surface of the energy storage or to a corresponding contact surface of the cooling plate. The equalization of the temperature difference can thus be carried out between the contact element and the energy storage or between the contact element and the cooling plate via the heat transfer surface.

The equalization of the temperature difference can be controlled by the different heat conducting properties of the contact element in the first or second region. The equalization of the temperature difference can take place more quickly in a region with a good heat-conducting property than in a region with a comparably poorer heat-conducting property. According to the invention, regions with good heat-conducting property can be preferably arranged at those points of the contact element at which a rapid equalization of the temperature difference is desired. The energy storage or the cooling plate can be in direct contact with both regions in that the first region and the at least one further region are arranged next to one another with respect to the heat transfer surface.

The first heat-conducting property and the further heat-conducting property can be characterized by different contact resistances of the first region and the at least one further region. A high contact resistance can thereby characterize a poor heat-conducting property, and a low contact resistance can characterize a good heat-conducting property. The respectively suitable heat-conducting property can be established by means of the different contact resistances.

For example, the first region can have a first material with a first contact resistance and the at least one further region can have a further material with a further contact resistance. The contact resistance can depend on the type as well as the nature of the material used. In particular, the contact resistance of a material can depend on the quantity of effective contact points. Thus when a coarser grained material is used, a lower contact resistance can be achieved than with the use of a material with finer granularity.

The different contact resistances of the first and the at least one further region can also be determined by different bearing pressures on the first region and the at least one further region. Here a higher bearing pressure can result in a lower contact resistance, and a lower bearing pressure can result in a higher contact resistance.

Alternatively or additionally, the first heat-conducting property and the further heat-conducting property can be characterized by different contact surfaces in the first region and the at least one further region. Here the size in terms of area of a contact surface in a respective region is decisive for a quality of the heat-conducting property of the respective region. Thus a larger contact surface can produce a better heat-conducting property than a smaller contact surface.

According to one embodiment, the different contact surfaces can be determined by recesses in the contact element. Corresponding recesses can be realized, for example, by offsets or embossings in one-dimensional or multi-dimensional patterns.

Alternatively or additionally, the different contact surfaces can be determined by corresponding recesses in the cooling plate.

According to an embodiment of the approach according to the invention, the first heat-conducting property and the further heat-conducting property can be characterized by different cross sections of the first region and of the at least one further region. Here a large material cross section can characterize a good heat-conducting property and a small material cross section can characterize a poor heat-conducting property.

The contact element can be a film and/or a cooling fin. In the case of the film, it can be an electrically insulating thermally conductive film with contact resistances differing in a graduated manner. The electrical insulation given as a result of the film can provide a protection from short circuits in the battery. The cooling fin can be embodied in order e.g., to convey the heat absorbed by the energy storage to the cooling plate. In addition the cooling fin can act as a mechanical holder for the energy cell. One advantage of the arrangement according to the invention lies in the number of possible variations for providing the changeable heat transfer, since corresponding changes to the film as well as to the cooling fin as well as combined to both elements can be carried out. The arrangement can thus be adapted to different requirements and conditions. A use of only the film, only the cooling fin or for example a use of two cooling fins per energy storage or other combinations are also possible within the scope of the approach according to the invention.

The present invention furthermore creates a device for the thermal connection of a plurality of cooling fins to a cooling plate, with the following features: a contact element with a heat transfer surface for providing the thermal connection, wherein the contact element has a first region with a first heat-conducting property and at least one further region with a further heat-conducting property, and wherein the first region and the at least one further region are arranged next to one another with respect to the heat transfer surface, and wherein the first region is suitable for the thermal connection of a first cooling fin and the at least one further region is suitable for the thermal connection of a further cooling fin.

A plurality of energy storage devices can be thermally connected to the cooling plate via the plurality of cooling fins. The first region and the at least one further region for thermal connection can adjoin one another or can be spaced apart from one another. In other words, the contact element can be realized as a continuous element or it can be assembled from several individual parts.

In addition, the present invention creates an energy storage device with the following features: at least one energy storage; a cooling plate; and at least one device for the thermal connection according to one of the preceding claims, which is arranged between the at least one energy storage and the cooling plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of the preferred exemplary embodiments of the present invention, the same or similar reference numbers are used for the elements that are shown in the various drawings and that act in a similar manner, a repeated description of these elements being omitted.

In a heat transfer between battery cell and cooling fin, with an areal thermal connection, uniform over the height, of a cooling fin to a cell outside surface, the heat flow flows over the entire cell height up to the heat sink at the base of the cooling fin (=cell base). Naturally, a considerable temperature difference results in the cooling fin as a result of the height of the cooling fin and depending on its thickness. The temperature difference over the cell height, which is labeled $\Delta T1$, is also correspondingly high.

According to the invention, a variable heat transfer between the battery cell and cooling fin is provided. To this end, the heat transfer is changed at a corresponding point locally between the cell surface and cooling fin depending on the height of the cooling fin and the temperature of the cooling fin. In this manner, as desired, a lower temperature difference can be achieved on the cell surface. Furthermore, a optimum can thereby be selected in a targeted manner between on the one hand a maximum permissible temperature difference on the cell surface $\Delta T1$ and on the other hand the lowest possible temperature difference between the highest temperature on the cell surface and the coldest temperature at the base of the cooling fin $\Delta T2$.

The heat flow Q can be represented by the following formula:

$$Q = k \times A \times \Delta T$$

In this, between the cell surface and the cooling fin:
A: is the contact surface
K: is the contact resistance
$\Delta T$: is the driving temperature difference As shown in the following figures, the changeable heat transfer, in particular to a battery cell, can be realized in different ways.

Figure 1:
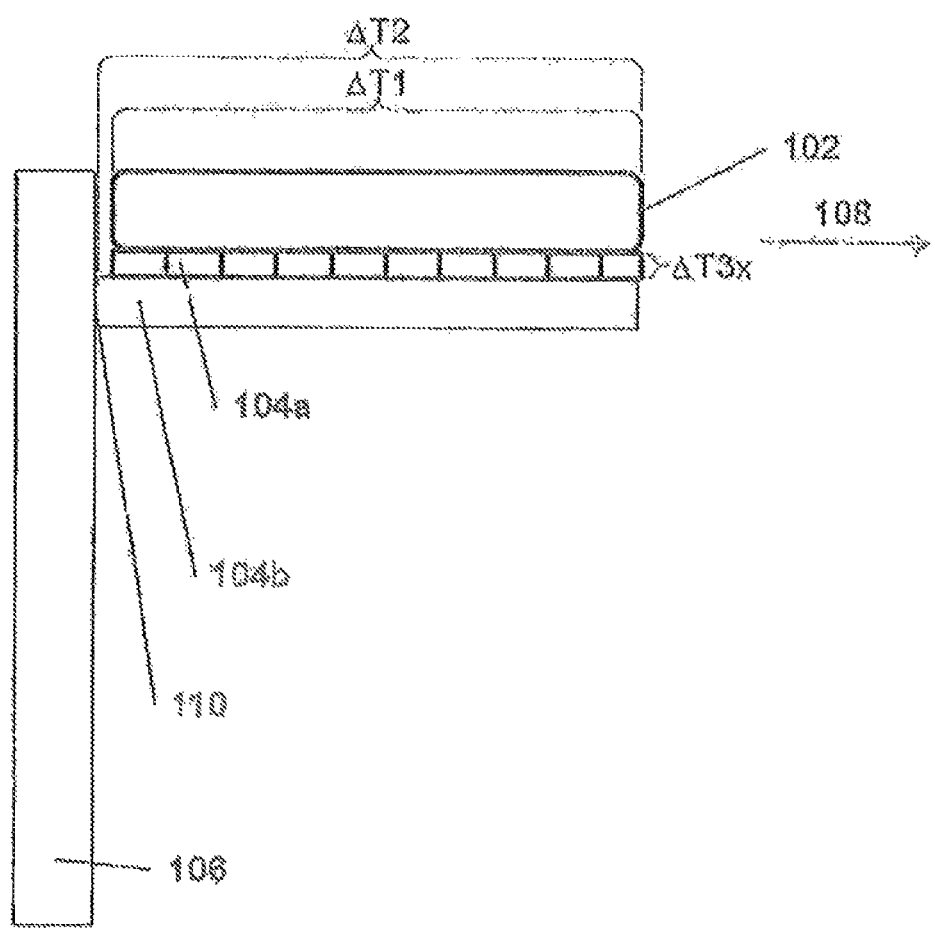
FIG. 1 is a representation of a device for the thermal connection of an energy storage, according to an exemplary embodiment of the present invention.

FIG. 1 shows an energy storage device with a device for the thermal connection of an energy storage according to an exemplary embodiment of the present invention. According to this exemplary embodiment, a variable heat transfer between a battery cell and a cooling fin is achieved through materials with different contact resistances.

The energy storage device has an energy storage 102, a contact element, which according to this exemplary embodiment comprises a film 104a and a cooling fin 104b, and a cooling plate 106.

The energy storage 102, the film 104a and the cooling fin 104b are arranged parallel to one another, the film 104a being arranged between the energy storage 102 and the cooling fin 104b. The cooling plate 106 is arranged at right angles to the cooling fin 104b.

The energy storage 102 bears against the film 104a over its height or cell height, the direction of which is denoted by the arrow 108. The film 104a bears against the cooling fin 104b with a side lying opposite the energy storage 102. The cooling fin 104b is connected to the cooling plate 106 by a surface facing towards the cooling plate 106, which surface is labeled base point 110. According to this exemplary embodiment, the energy storage 102 and the film 104a are spaced apart from the cooling plate 106.

A temperature difference on a surface of the energy storage 102 is denoted by $\Delta T1$. $\Delta T2$ denotes a temperature difference between a highest temperature on the surface of the energy storage 102 and a lowest temperature at the base point 110. $\Delta T3x$ denotes different temperature differences between the surface of the energy storage 102 and an opposite side of the cooling fin 104b. A highest temperature difference $\Delta T3x$ can thereby lie in the region of the base point 110.

The energy storage 102 can be embodied as a battery cell. The film can be an electrically insulating thermally conductive film 104a with variable contact resistance. The variable contact resistance of the thermally conductive film 104a can be given in that the thermally conductive film 104a, as shown in FIG. 1, is divided into a plurality of regions with different specific contact resistances. The cooling fin can be a cooling structure 104b and in particular a heat-conducting cooling fin. The base point 110 of the cooling fin 104b can be connected to the cooling plate 106 by adhesive force or by another heat-conducting connection. The cooling plate 106 can be embodied as a base plate with cooling, e.g., via interior channels.

In the exemplary embodiment shown in FIG. 1, a variable or changeable heat transfer between the battery cell and the cooling fin is achieved by materials with different contact resistances, i.e., by a change of the k value. According to this exemplary embodiment, materials with different levels of heat conductivity, for example, materials based on different plastics (PVC, PA or POM) or, for instance, strips of thermally conductive films with contact resistances differing in a graduated manner, are arranged between the cooling fin and the battery cell such that the best thermal conductivity or the smallest contact resistance is produced at the "worst efficiency point." According to this exemplary embodiment, the worst efficiency point corresponds to the highest point of the cooling fin and/or of the battery cell. In addition to a first thermally conductive film, graduated in the direction of the base point ("best efficiency point") of the cooling fin, at least one further thermally conductive film with poorer heat-conducting property than the first or with a higher contact resistance than the first is used. In this manner the temperature difference ΔT1 on the battery surface can be reduced. An alternative solution lies in using a thermally conductive film that already has a suitable graduation or a profile in a dimension with respect to the contact resistance. This can take place, e.g., via different volumetric efficiency, i.e. the material properties change within a dimension. The number of the regions and their respective height or width can vary suitably depending on the desired maximum temperature difference and on the size of the heat flow to be removed or supplied.

Figure 2:
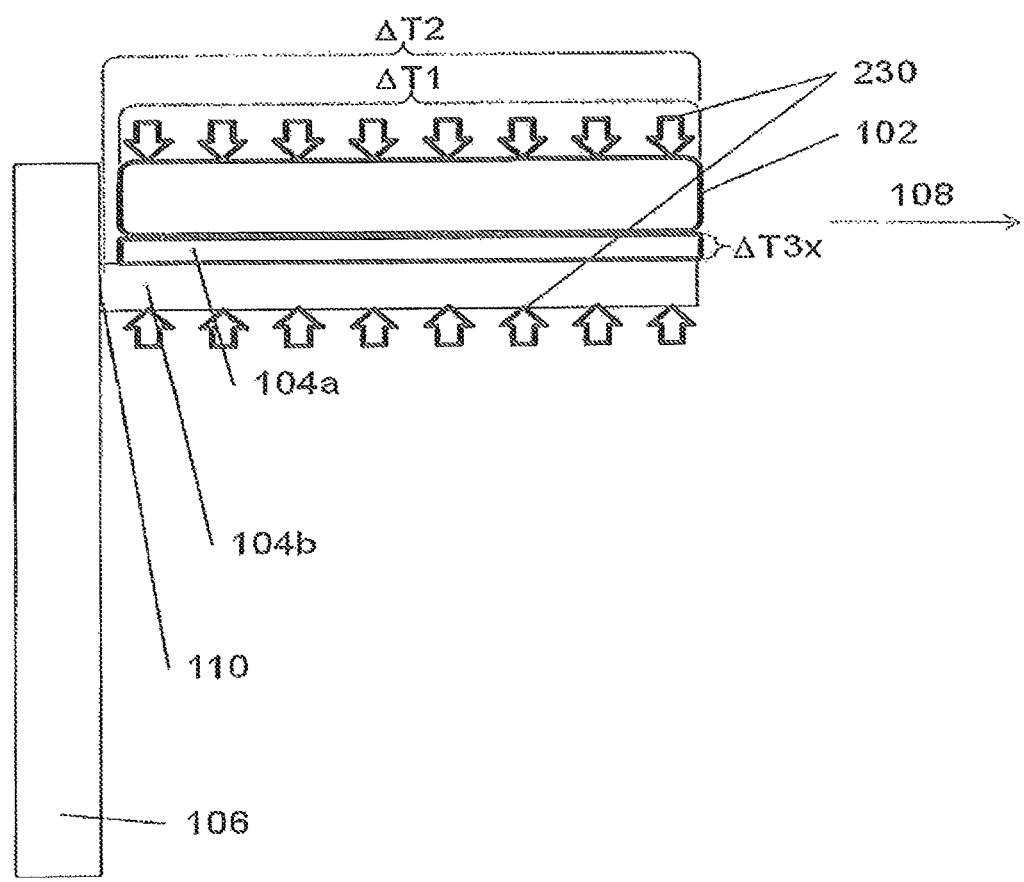
FIGS. 2-4 are representations of a device for the thermal connection of an energy storage, according to further exemplary embodiments of the present invention.

FIG. 2 shows an energy storage device with a device for the thermal connection of an energy storage according to an exemplary embodiment of the present invention. According to this exemplary embodiment, a variable heat transfer between a battery cell and a cooling fin is achieved by a change in a bearing pressure.

The energy storage device shown in FIG. 2 corresponds to the energy storage device shown in FIG. 1, with the difference that the heat transfer is not realized by different materials in the thermally conductive film 104a, but by a variable bearing pressure. Here the film can thus be embodied as an electrically insulating thermally conductive film with uniform contact resistance. The variable bearing pressure between the energy storage 102 and the cooling fin 104a is characterized in FIG. 2 by a plurality of arrows, only two of which, for the sake of clarity, are provided with the reference number 230.

According to this exemplary embodiment, the changeable heat transfer is realized by changing the "k" value. The contact resistance "k" is among other things a function of the bearing pressure. A high bearing pressure causes a reduction of the contact resistance. According to this exemplary embodiment, the heat transfer is suitably influenced by the change in the bearing pressure of the cooling fin to the cell over the cooling fin height in that the highest bearing pressure is applied at the "worst efficiency point". At least one other, preferably smaller, bearing pressure is used graduated in the direction of the "base point" ("best efficiency point") of the cooling fin, whereby the contact resistance is increased. In this manner the temperature difference ΔT1 on the battery surface can be reduced.

Figure 3:
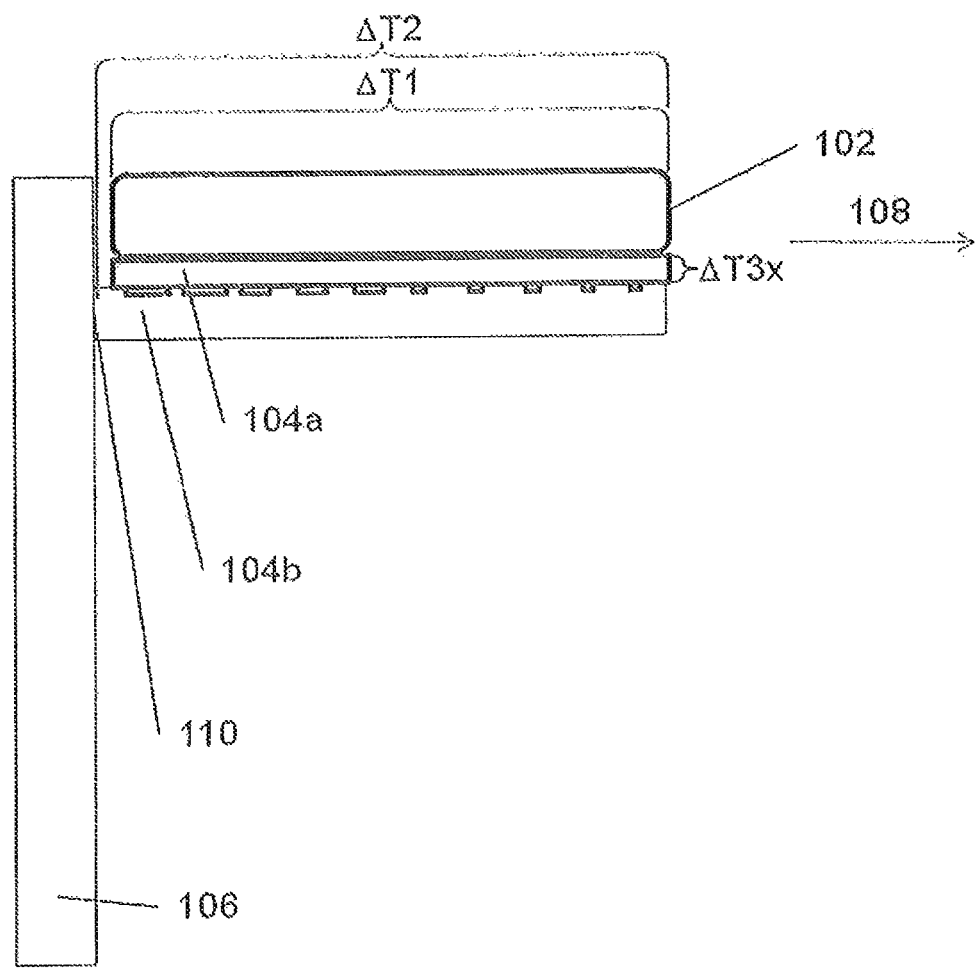

FIG. 3 shows an energy storage device with a device for the thermal connection of an energy storage according to an exemplary embodiment of the present invention. According to this exemplary embodiment, a variable heat transfer between a battery cell and a cooling fin is achieved by differently sized contact surfaces on the cooling fin.

The energy storage device shown in FIG. 3 corresponds to the energy storage device shown in FIG. 2, with the difference that the heat transfer is not realized by a variable bearing pressure on the thermally conductive film 104a, but by differently sized contact surfaces of the cooling fin 104b with respect to the thermally conductive film 104a. The thermally conductive film 104a can be realized with uniform contact resistance. In contrast to the exemplary embodiment shown in FIG. 2, the cooling structure is here embodied as a heat-conducting cooling fin 104b with offsets, embossings or the like, as is shown in FIG. 3 based on the broken line. The differently sized contact surfaces are shown diagrammatically by the gaps of different sizes in the broken line on the surface of the cooling fin 104b.

In the exemplary embodiment shown in FIG. 3, the changeable heat transfer is realized by changing the "A" value, which represents the contact surface. According to this exemplary embodiment, differently sized contact surfaces are inserted between the battery cell and the cooling fin, so that the largest possible contact surface is available at the worst efficiency point. At least one other, preferably smaller contact surface is used graduated in the direction of the "base point" ("best efficiency point") of the cooling fin, whereby the heat transfer is locally diminished. In this manner, the temperature difference ΔT1 on the battery surface can be reduced. For example, the contact surface on the cooling fin over the height can be changed in a targeted manner by offsets and/or embossings in one-dimensional or multi-dimensional patterns, e.g., stripe and/or perforated patterns.

Figure 4:
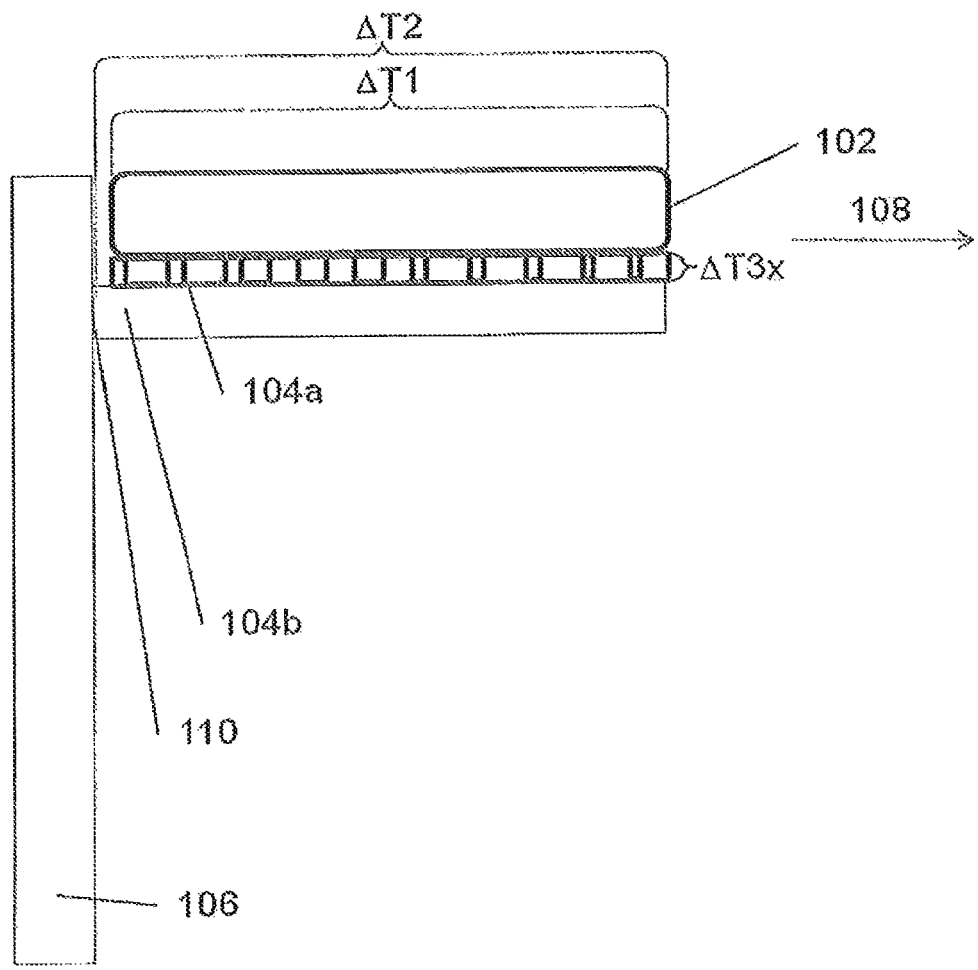

FIG. 4 shows an energy storage device with a device for the thermal connection of an energy storage according to an exemplary embodiment of the present invention. According to this exemplary embodiment, a variable heat transfer is achieved between a battery cell and a cooling fin by means of differently sized contact surfaces on the thermally conductive film.

The energy storage device shown in FIG. 4 corresponds to the energy storage device shown in FIG. 3, with the difference that the heat transfer here is realized by differently sized contact surfaces of the thermally conductive film 104a regarding the cooling fin 104b and/or regarding the energy storage device 102. The cooling fin 104b can thereby again be embodied analogously to FIGS. 1 and 2 as a cooling structure in the form of a heat-conducting cooling fin without embossings or the like. However, in contrast to FIG. 3, in the exemplary embodiment shown in FIG. 4 the film is embodied as an electrically insulating thermally conductive film 104a with uniform contact resistance but variable contact surface. For example, the thermally conductive film 104a is perforated. In FIG. 4 this is shown based on the differently sized breaks in the representation of the film 104a.

In the exemplary embodiment shown in FIG. 4, the changeable heat transfer in turn is realized by changing the "A" value. The changeable heat transfer is achieved analogously to FIG. 3, with the difference that the change in the contact surface is made in the thermally conductive film, instead of in the cooling fin, e.g., by a suitable perforation.

Analogously to the solutions according to the invention that are shown in FIGS. 1 through 4, a variable heat transfer can also be produced between one or more cooling fins and a cooling plate. In the following figures a plurality of cooling fins is respectively shown in connection with corresponding energy storage arrangements. The cooling fins can be arranged directly between the energy storage devices for reasons of space. A cooling plate is generally understood to be a component conveying a coolant, to which component the cooling fins are attached for heat dissipation.

As shown in the following figures, the changeable heat transfer, in particular to the cooling plate, can be realized in different ways.

Figure 5:
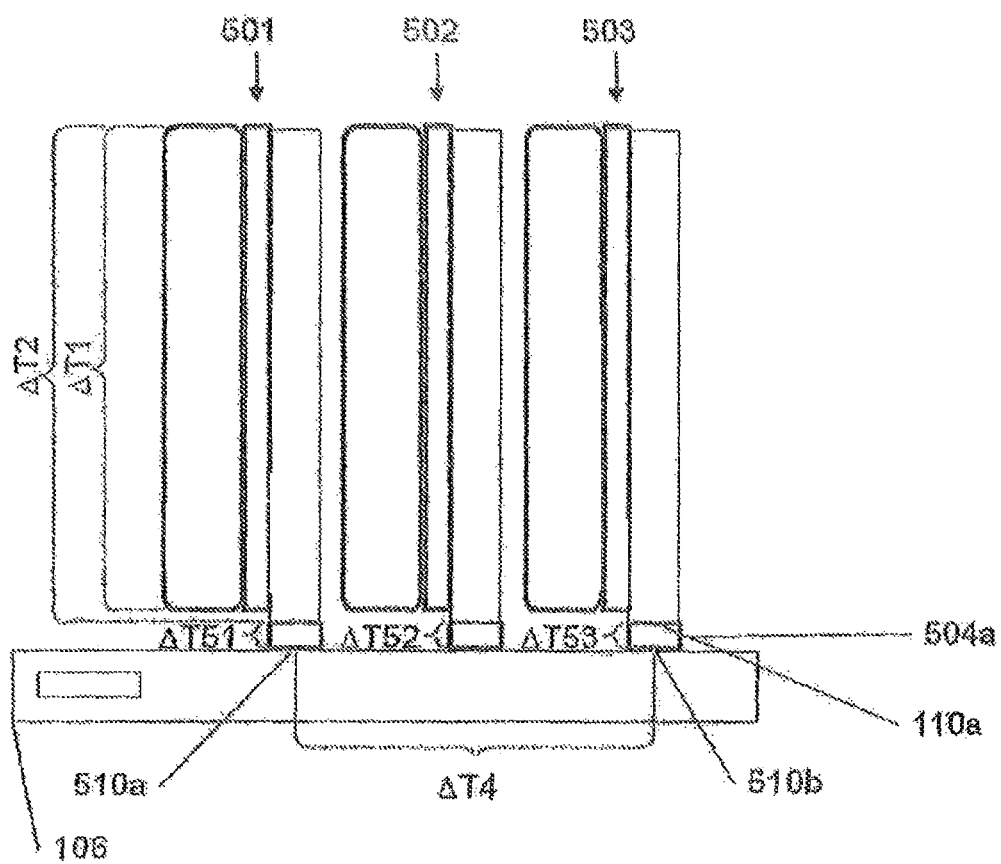
FIG. 5 is a representation of a device for the thermal connection of a cooling plate, according to an exemplary embodiment of the present invention.

FIG. 5 shows an energy storage device with a device for the thermal connection of a cooling plate according to an exemplary embodiment of the present invention. According to this exemplary embodiment, a variable heat transfer is achieved between cooling fins and the cooling plate by materials with different contact resistances. This approach corresponds to the approach described based on FIG. 1.

The energy storage device has a first energy storage arrangement 501, a second energy storage arrangement 502 and a third energy storage arrangement 503 as well as a cooling plate 106. The energy storage arrangements 501, 502, 503, as described in FIG. 1, respectively have an energy storage in the form of a battery cell, a film and a cooling fin. For the sake of clarity, the energy storage, the films and the cooling fins are not provided with reference number in this or the following figures. The cooling fins can be connected to the cooling plate 106 either directly or via an intermediate film 504a. According to this exemplary embodiment, the cooling fins of the energy storage arrangements 501, 502, 503 are respectively connected to the cooling plate 106 via the intermediate film 504a. The intermediate film 504a can be continuously arranged on a surface of the cooling plate 106 or, as shown in FIG. 5, it can be composed of individual film sections, which are respectively arranged between the individual cooling fins and the surface of the cooling plate 106. In order to embody the different contact resistances, the individual film sections can have different materials.

The intermediate film 504a can be embodied as an electrically insulating thermally conductive film with variable contact resistance. According to this exemplary embodiment, a surface of the cooling fins facing towards the cooling plate 106 is respectively labeled as the base point of a cooling fin 110a. Moreover, in FIG. 5 a best efficiency point 510a and a worst efficiency point 510b are shown. The best efficiency point 510a is assigned to the first arrangement 501, and the worst efficiency point 510b is assigned to the third arrangement 503. The cooling plate 106 can be embodied as a cooling plate with a cooling, e.g. with interior channels.

A temperature difference on a surface of the energy storage is denoted by $\Delta T1$. $\Delta T2$ denotes a temperature difference between a highest temperature on the surface of the respective energy storage and a lowest temperature at the respective base point 110a of the cooling fins. $\Delta T4$ represents a temperature difference between the cooling fins and between the battery cells of the first arrangement 501 and the third arrangement 503. $\Delta T51$, $\Delta T52$, $\Delta T53$ denote the individual temperature differences over the individual film sections. The individual temperature differences $\Delta T51$, $\Delta T52$, $\Delta T53$ can be influenced by the different materials of the individual film sections.

According to the exemplary embodiment shown in FIG. 5, the variable heat transfer between the cooling fin and the cooling plate can be achieved by changing the "k" value. To this end, materials that conduct heat well, such as strips of thermally conductive films with contact resistances that differ in a graduated manner, are arranged between the cooling plate and the cooling fins such that the best heat conductivity or the smallest contact resistance is produced at the worst efficiency point. In the case of cooling (cooling case), this can be the warmest region of the cooling plate, while conversely in the case of heating (heating case), the coldest region can be a "heating plate." At least one further thermally conductive film with poorer heat-conducting property than the first and/or higher contact resistance than the first is used graduated in the direction of the best efficiency point, which, in the case of cooling, is the coldest region of the cooling plate and in the case of heating, is the warmest region of the "heating plate." In this manner the temperature difference between the cooling fins and thus the temperature differences between the battery cells of an entire battery can be reduced. An alternative solution lies in a use of a thermally conductive film, which already has a suitable gradation or a profile with respect to the contact resistance, e.g., via different volumetric efficiencies, i.e., the material properties change within the one film.

Figure 6:
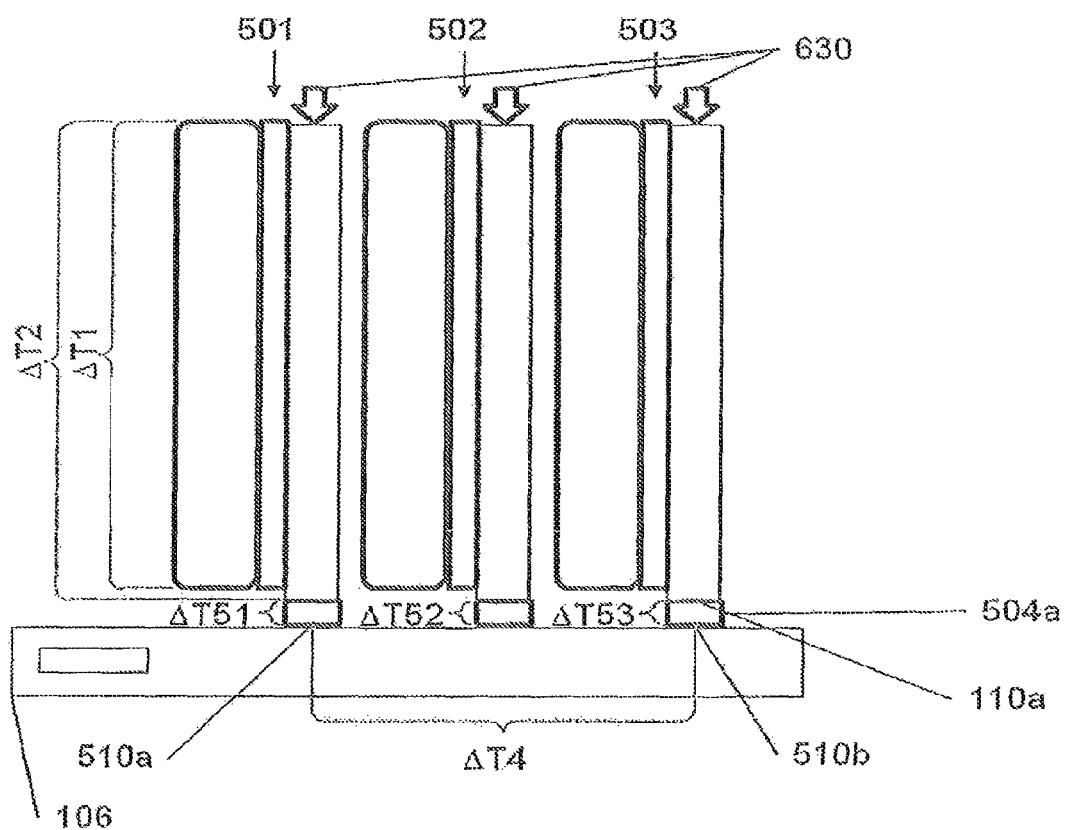
FIGS. 6-9, 10a and 10b are a representation of a device for the thermal connection of a cooling plate, according to further exemplary embodiments of the present invention.

FIG. 6 shows an energy storage device with a device for the thermal connection of a cooling plate according to an exemplary embodiment of the present invention. According to this exemplary embodiment, a variable heat transfer is achieved between the cooling fins and the cooling plate by a change of the bearing pressure.

The energy storage device shown in FIG. 6 corresponds to the energy storage device shown in FIG. 5, with the difference that the heat transfer is not realized by different materials in the intermediate film 504a, but by a variable bearing pressure. The film 504a can thus be embodied here as an electrically insulating thermally conductive film with uniform contact resistance. The variable bearing pressure is denoted in FIG. 6 by a plurality of arrows, which are provided with the reference number 630.

According to this exemplary embodiment, the changeable heat transfer is realized by changing the "k" value. The contact resistance "k" is among other things a function of the bearing pressure. By changing the bearing pressure of the cooing fin to the cooling plate, the heat transfer can be suitably influenced, in that the highest bearing pressure is applied at the worst efficiency point. In the event of a cooling, the worst efficiency point corresponds to the warmest region of the cooling plate, while conversely in the case of heating, it corresponds to the coldest region of a "heating plate." At least one other, preferably smaller, bearing pressure is used graduated in the direction of the best efficiency point of the cooling plate, whereby the contact resistance $\Delta T5x$ is increased. In this manner, the temperature difference $\Delta T4$ between the cooling fins and thus between the battery cells can be reduced.

Figure 7:
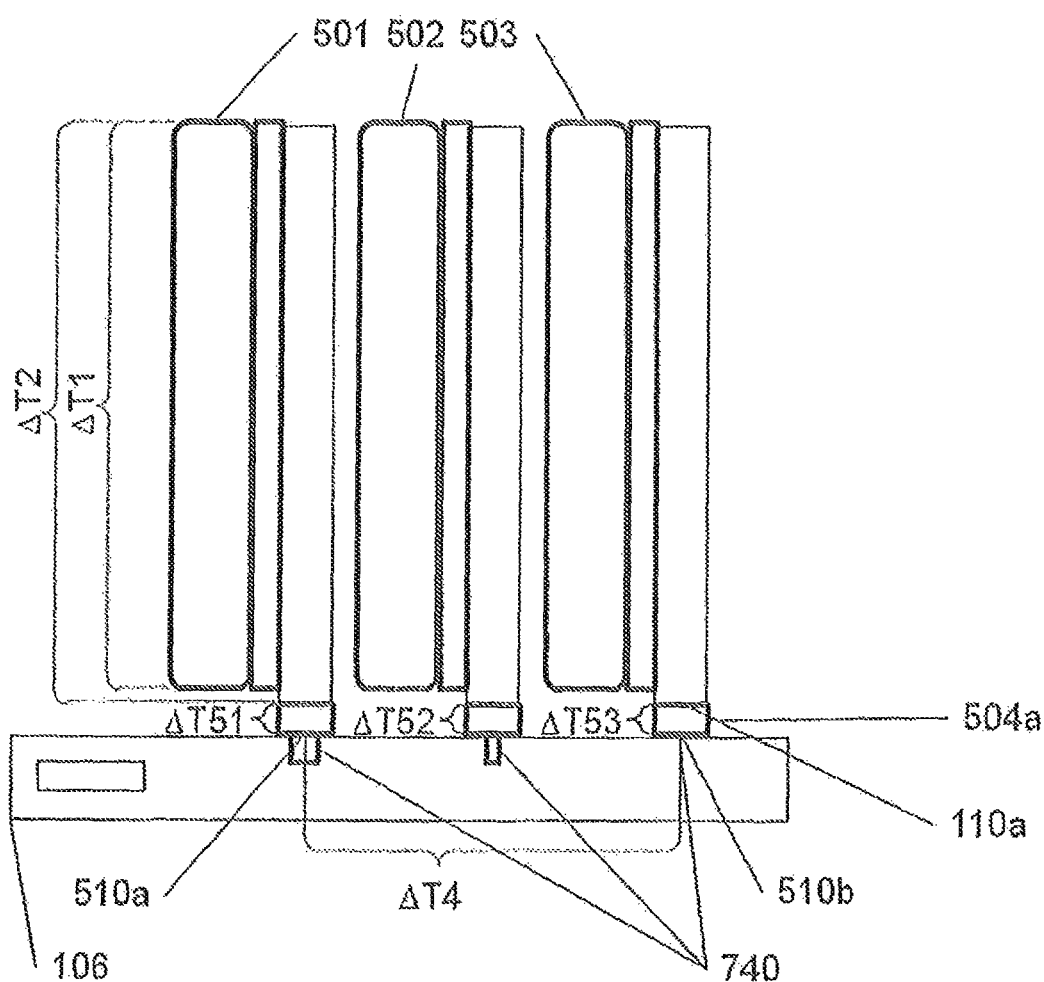

FIG. 7 shows an energy storage device with a device for the thermal connection of a cooling plate according to an exemplary embodiment of the present invention. According to this exemplary embodiment, a variable heat transfer between the cooling fins and the cooling plate is achieved by differently sized contact surfaces on the cooling plate.

FIG. 7 shows an energy storage device that corresponds to the energy storage device shown in FIG. 5, with the difference that the heat transfer is not realized by different materials of the intermediate film 504a, but by differently sized contact surfaces on the cooling plate 106. In contrast to the exemplary embodiment shown in FIG. 5, the film here can be embodied as an electrically insulating thermally conductive film with uniform contact resistance. In FIG. 7 the cooling plate 106 with cooling channels has a variable contact surface to the cooling fins. As shown in FIG. 7, the variable contact surfaces can be realized in that regions of the cooling plate 106, which are arranged opposite the individual cooling fins, are provided with differently sized recesses 740. The size of the respective contact surface to the intermediate film 504a and thus to the respective cooling film is determined through the recesses 740.

According to the exemplary embodiment shown in FIG. 7, the changeable heat transfer between the cooling fin and the cooling plate is achieved via a change of the "A" value. To this end, differently sized contact surfaces are used between the battery cell and the cooling fin, so that the largest possible contact surface is available at the worst efficiency point, i.e., the warmest region of the cooling plate in the case of cooling or the coldest region of the "heating plate" in the case of heating. At least one other, preferably smaller, contact surface is used graduated in the direction of the best efficiency point of the cooling plate, which in the case of cooling is the coldest region of the cooling plate and conversely in the case of heating is the warmest region of the "heating plate," whereby the heat transfer is locally degraded. In this manner the temperature difference ΔT4 between the cooling fins and thus between the battery cells can be reduced. For example, the contact surface on the cooling plate can be changed in a targeted manner by offsets, perforations, embossings, etc. in one-dimensional or multi-dimensional patterns, e.g., striped and/or perforated patterns.

Figure 8:
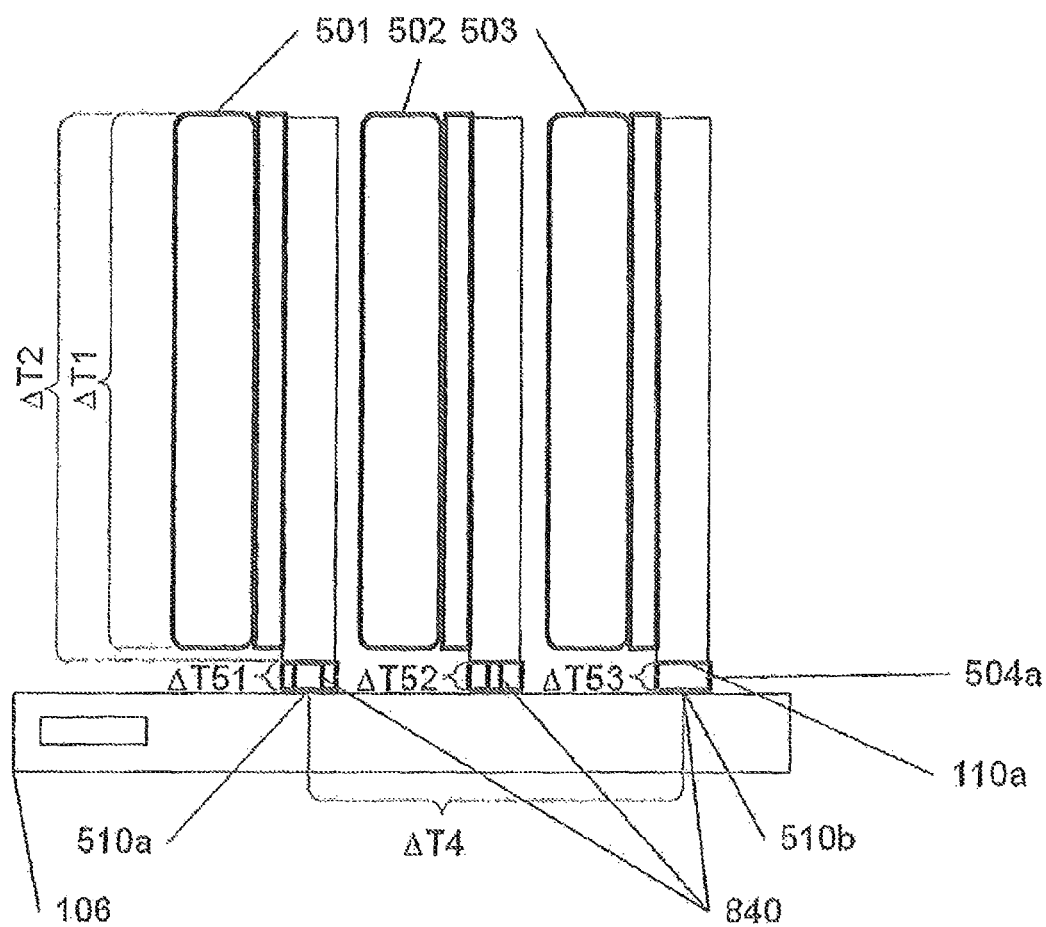

FIG. 8 shows an energy storage device with a device for the thermal connection of a cooling plate according to an exemplary embodiment of the present invention. According to this exemplary embodiment, a variable heat transfer is achieved between the cooling fins and the cooling plate by differently sized contact surfaces on the thermally conductive film.

The energy storage device shown in FIG. 8 corresponds to the energy storage device shown in FIG. 7 with the difference that the heat transfer is realized here by differently sized contact surfaces of the intermediate film 504a regarding the cooling fins and the cooling plate 106. The cooling plate 106, analogously to FIGS. 5 and 6, can here again be embodied as a cooling plate with cooling channels. In contrast to FIG. 7, in the exemplary embodiment shown in FIG. 8 the intermediate film 504a is embodied as an electrically insulating thermally conductive film with uniform contact resistance but variable contact surface. For example, the thermally conductive film 504a is perforated. In FIG. 8, this can be seen based on the differently sized breaks 840 in the representation of the individual film sections.

In the exemplary embodiment shown in FIG. 8, the changeable heat transfer between the cooling fin and the cooling plate is produced in a similar manner to that described in FIG. 7, with the difference that the change in the contact surface is embodied in the thermally conductive film or intermediate film, e.g., by a suitable perforation of the film.

Figure 9:
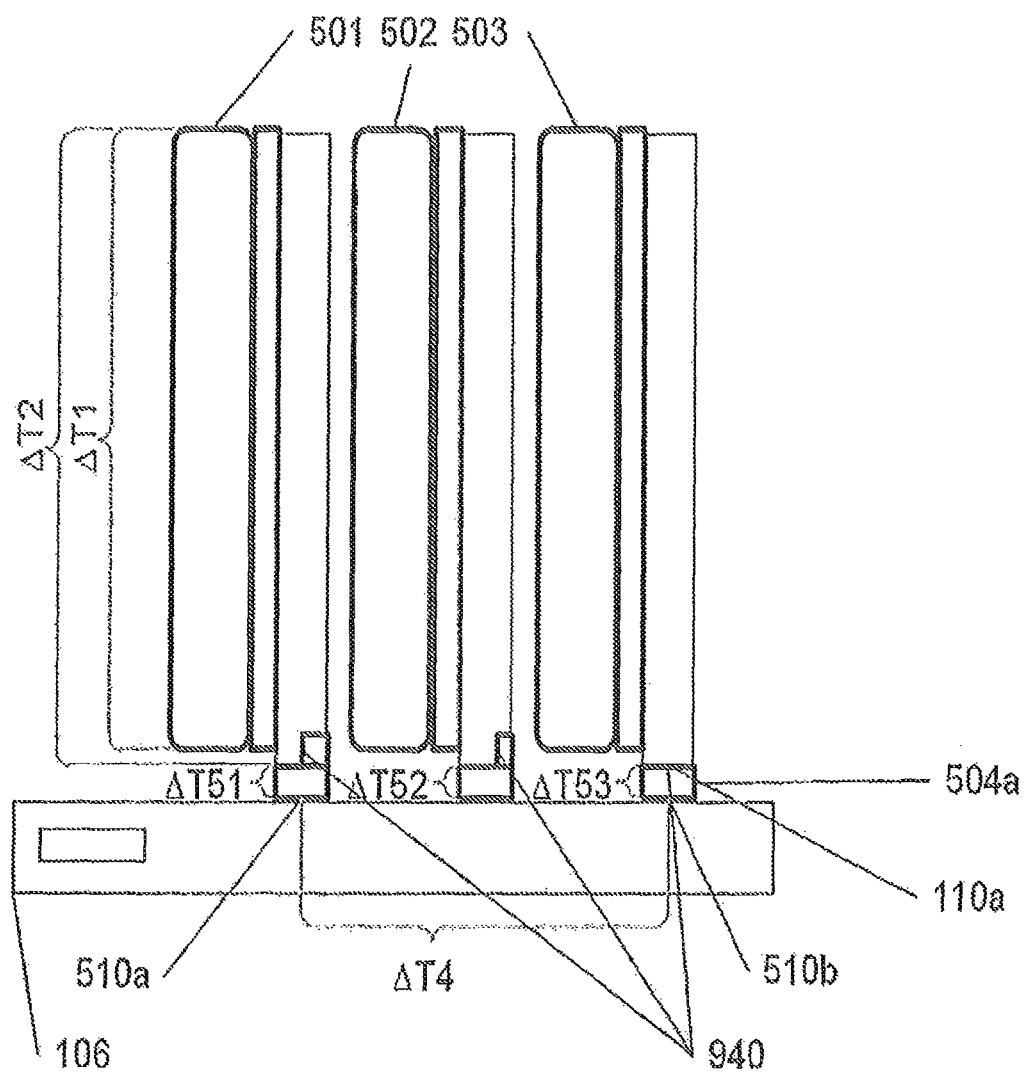

FIG. 9 shows an energy storage device with a device for the thermal connection of a cooling plate according to an exemplary embodiment of the present invention. According to this exemplary embodiment, a variable heat transfer between the cooling fins and the cooling plate is achieved by differently sized contact surfaces on the cooling fin.

The energy storage device shown in FIG. 9 corresponds to the energy storage device shown in FIG. 7, with the difference that the heat transfer is realized here by differently sized contact surfaces of the individual cooling fins regarding the intermediate film 504a, wherein the cooling plate 106 is again embodied here analogously to FIGS. 5, 6 and 8 as a cooling plate with cooling channels. In contrast to FIG. 7, in the exemplary embodiment shown in FIG. 9, the cooling fins are embodied as cooling fins with variable contact surface, in that, for example, differently sized recesses 940 are provided in the sides of the cooling fins that adjoin the intermediate film 504a. The size of the respective recess 940 is determined by the size of the contact surface of the respective cooling fin to the intermediate film 504a and thus to the cooling plate 106.

In the exemplary embodiment shown in FIG. 9, the changeable heat transfer between the cooling fin and the cooling plate is produced in a similar manner to that described in FIG. 7, with the difference that the change in the contact surface is carried out on the cooling fins, e.g., by means of suitable punched holes, perforations, deformations, embossings, etc.

Figure 10:
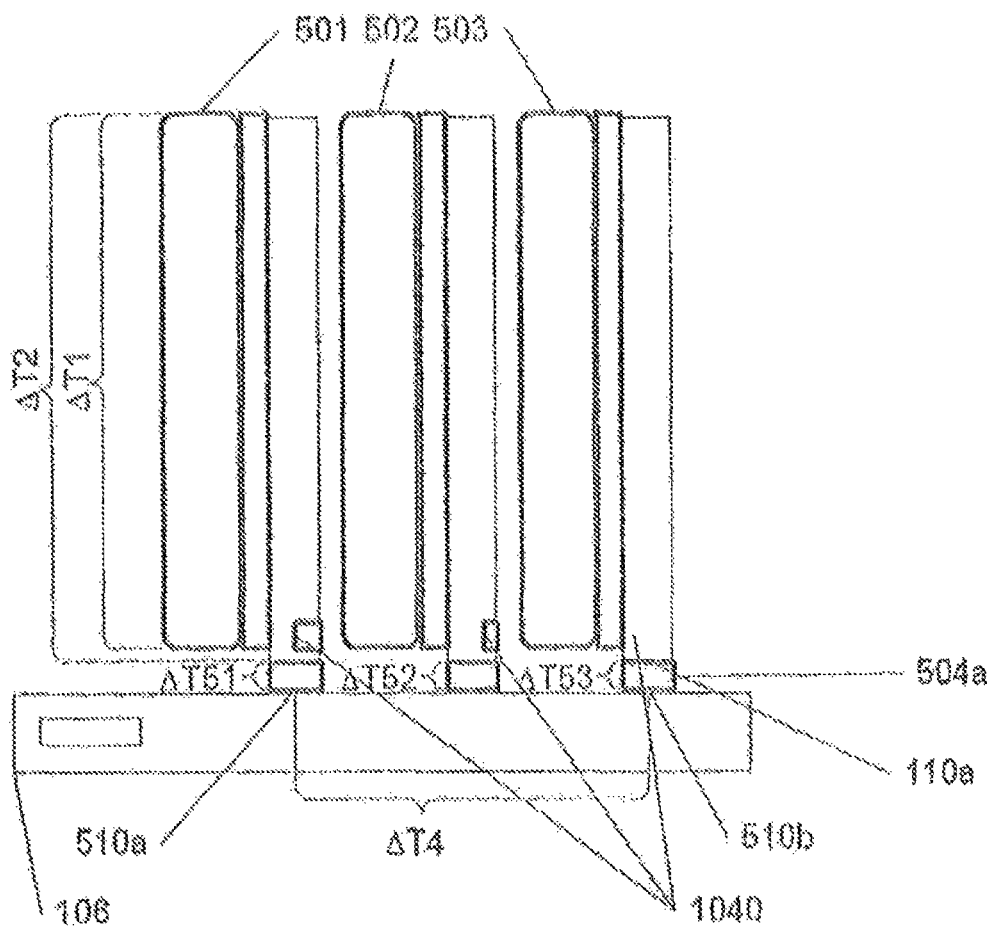
Figure 11:
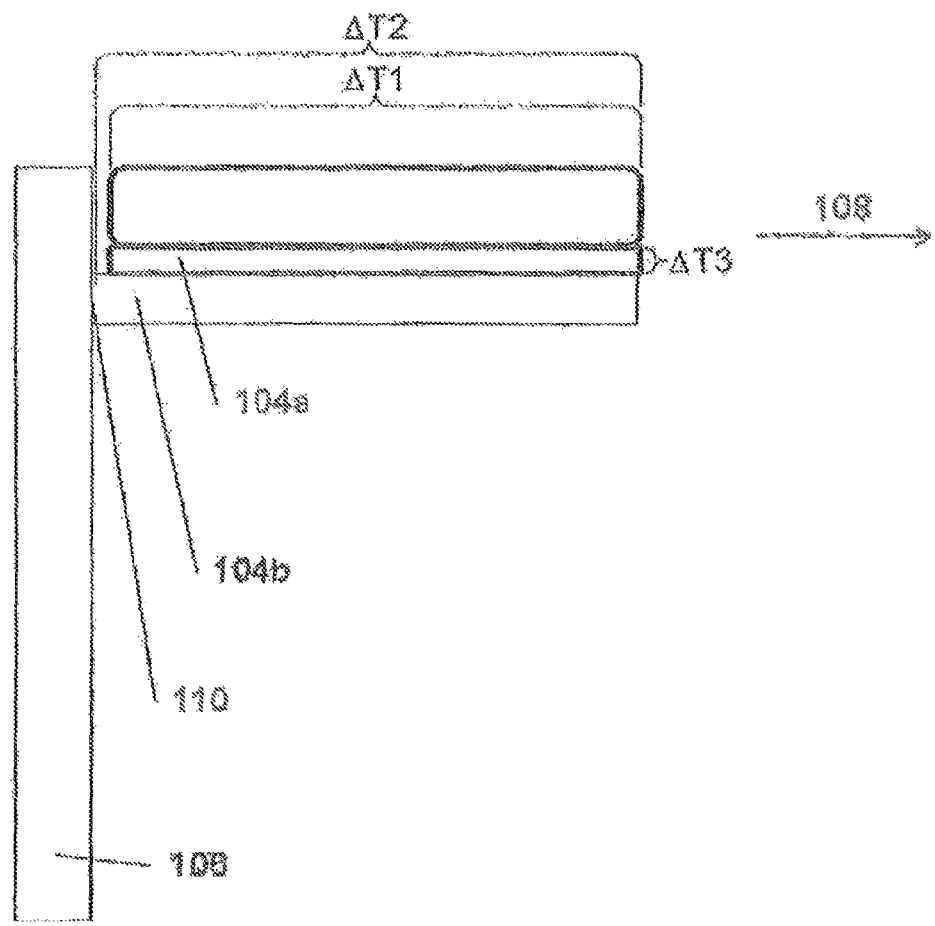
FIG. 11 is a representation of a device for the thermal connection of an energy storage, according to the conventional art.
Figure 12:
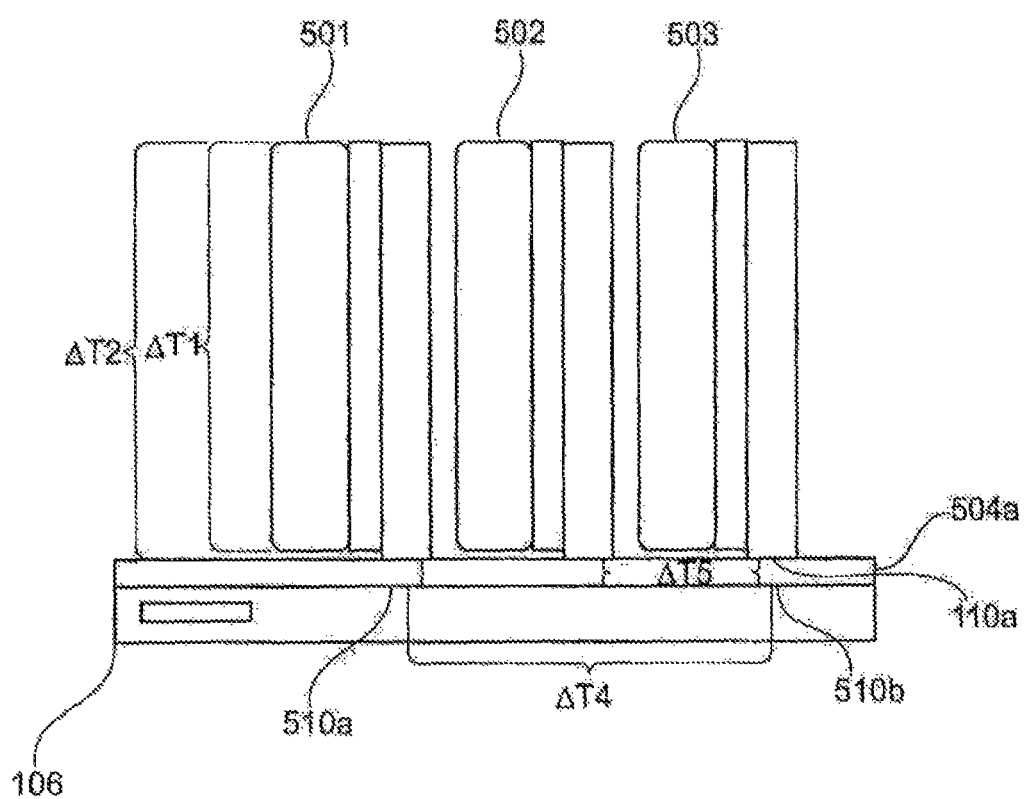
FIG. 12 is a representation of a device for the thermal connection of a cooling plate, according to the conventional art.

FIG. 10a shows an energy storage device with a device for the thermal connection of a cooling plate according to an exemplary embodiment of the present invention. According to this exemplary embodiment, a variable heat transfer between the cooling fins and the cooling plate is achieved by differently sized material cross sections in the cooling fins.

FIG. 10a shows an energy storage device that corresponds to the energy storage device shown in FIG. 5, with the difference that the heat transfer is not realized by different materials in the intermediate film 504a, but by differently sized material cross sections in the cooling fins. In contrast to the exemplary embodiment shown in FIG. 5, the film can be embodied here as an electrically insulating thermally conductive film with uniform contact resistance. In FIG. 10a the cooling fins are embodied as cooling fins with variable heat-conducting cross section 1040, i.e., for different heat-conducting properties the cooling fins are provided with correspondingly different heat-conducting cross sections 1040.

In the exemplary embodiment shown in FIG. 10a, the changeable heat transfer between the cooling fin and the cooling plate is produced in a similar manner to that described in FIG. 7, with the difference that the change in the heat transfer from the cooling fin to the cooling plate is carried out by a reduction of the heat-conducting cross-sectional surface in the cooling fin, e.g., by a graduated reduction of the cooling fin thickness. The highest cooling fin thickness is used at the worst efficiency point. At least one smaller cooling fin thickness is used graduated in the direction of the best efficiency point. Alternatively, notches in the vicinity of the base point are proposed, which suitably reduce the cross-sectional area of the cooling fins.

FIG. 10b shows a further exemplary embodiment of an energy storage device according to the present invention. According to this exemplary embodiment, the individual energy storage devices 501, 502 and 503 are connected to the cooling plate 106 via an intermediate film 504a. Alternatively, the individual energy storage devices 501, 502 and 503 could also be connected directly to the cooling plate 106. The connection of the energy storage devices can be carried out in a similar manner in further exemplary embodiments to the connection of the cooling fins to the cooling plate 106 according to FIGS. 5, 6, 7 and 8.

In order to reduce the temperature difference inside the cells or also inside the entire cell arrangement in a desired manner, the respectively most suitable exemplary embodiment can be selected. The exemplary embodiments shown are thereby selected merely by way of example and can be combined with one another. Also the described elements, the arrangement and number thereof are selected merely by way of example and can be adapted accordingly according to different conditions.

Figure 13:
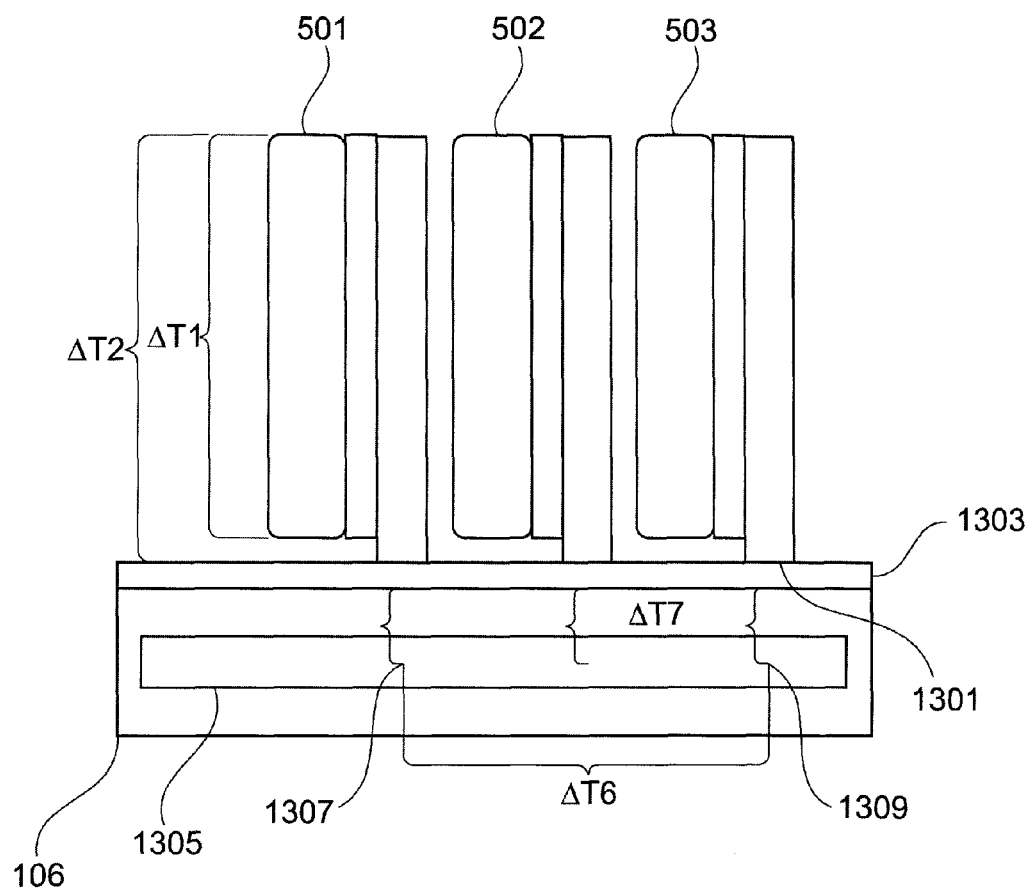
FIGS. 13-21 are representations of a device for the thermal connection of a fluid, according to further exemplary embodiments of the present invention.

FIG. 13 shows an energy storage device with a device for the thermal connection of a fluid to a cooling plate 106, which renders possible a uniform heat transfer between the fluid and the cooling plate. Battery cells 501, 502, 503 are shown, which are respectively arranged on a cooling fin. A base point 1301 of a cooling fin can be connected to the cooling plate 106, e.g., via a thermally conductive film 1303, which is electrically insulating and has a uniform contact resistance. The cooling plate 106 has a cooling, e.g., with interior channels 1305, in which the fluid can flow. Furthermore, a best efficiency point 1307 and a worst efficiency point 1309 of the cooling plate 106 and of the cooling channel 1305 respectively are shown.

The cooling channel 1305 for guiding the fluid has a heat transfer surface for providing the thermal connection of the fluid to the cooling plate 106. The heat transfer surface can be an outer surface of the cooling channel 1305. The cooling channel 1305 thereby has a first region with a first heat-conducting property and at least one further region with a further heat-conducting property. The first region and the at least one further region are arranged next to one another with respect to the heat transfer surface. According to this exemplary embodiment, the first region and the at least one further region have the same heat-conducting property in order to render possible the uniform heat transfer between the fluid and the cooling plate 106.

Based on the following figures, a changeable heat transfer between the cooling plate 106 and the cooling fluid is proposed according to the same principle according to the invention, in order to keep the temperature differences between several battery cells 501, 502, 503 as low as possible. In a corresponding manner a variable heat transfer can be created between a heating fin and a heating fluid.

In the approach according to the invention, the heat transfer is changed locally between the heat-transferring or cold-transferring fluid and the component flowed through by the fluid, depending on the temperature at this point. In this manner, as desired, a lower temperature difference on the cooling plate surface can be achieved.

The heat flow Q as is known can be represented by the following formula:

$$Q = \alpha \times A \times \Delta T$$

In this between the cell surface and the cooling fin:
A: is the contact surface
α: is the heat transfer coefficient
ΔT: is the driving temperature difference.

The changeable heat transfer can be realized in different ways. Analogously to the solutions according to the invention, which are described based on FIGS. 1 through 12, this approach is applied to the heat transfer between the heat-transferring or cold-transferring fluid and the component flowed through by the fluid, frequently referred to as the "cooling plate" on which the cooling fins or battery cells are attached for heat dissipation.

Figure 14:
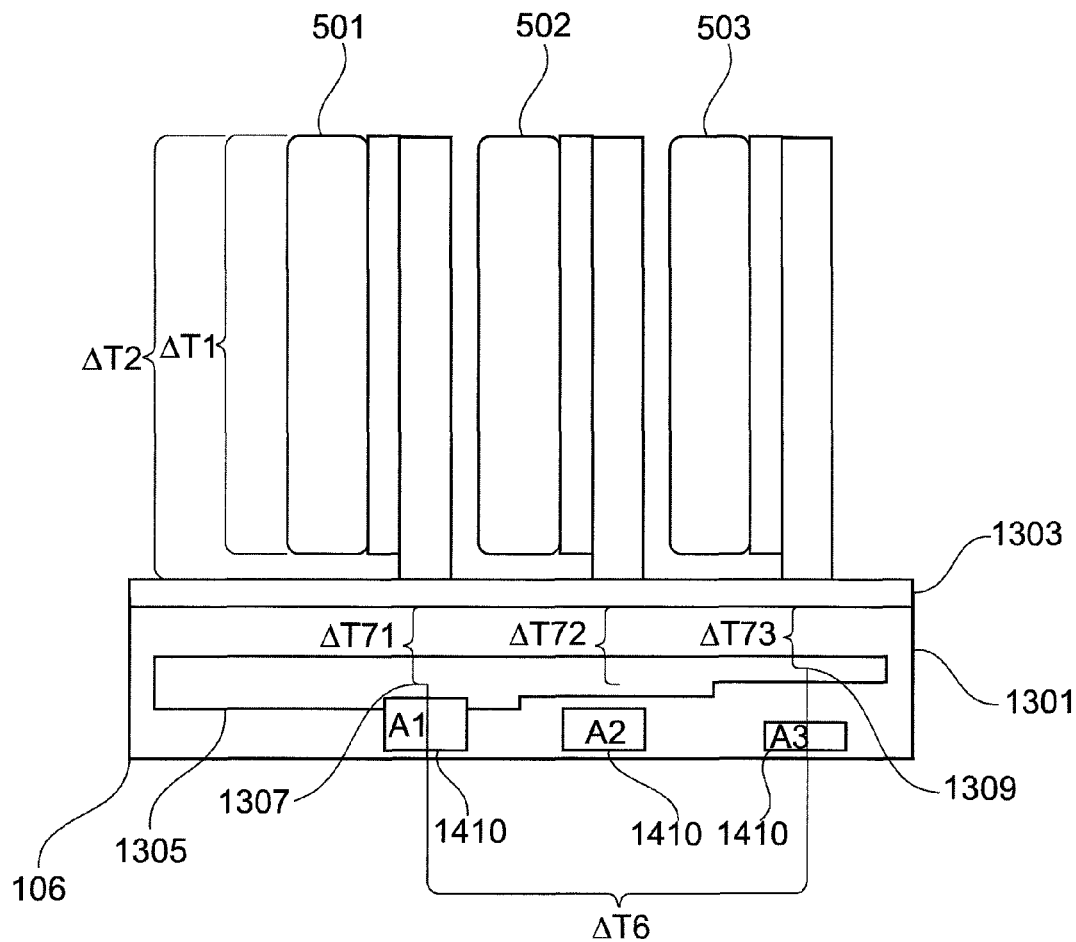

FIG. 14 shows an energy storage device with a device for the thermal connection of a fluid to a cooling plate 106, which renders possible a variable heat transfer between the fluid and the cooling plate. The variable heat transfer can be realized by different alpha values, e.g., different flow rates.

In contrast to the exemplary embodiment shown in FIG. 13, the channel according to this exemplary embodiment has different channel cross sections 1410 in the individual regions. Thus the cross section is reduced from a large cross section 1410 A1 to a small cross section 1410 A3. A first heat transfer property and a further heat transfer property can thus be characterized by different channel cross sections of the first region and the at least one further region of the cooling channel 1305.

According to this exemplary embodiment, the variable heat transfer is achieved, e.g., by a change of the "α" value. The heat transfer coefficient "α" is among other things a function of the flow rate (laminar/turbulent, etc.). It is therefore proposed to suitably influence the flow rate, e.g., by the selection of the channel cross-sectional area, so that the best heat transfer coefficient results at the "worst efficiency point" 1309. At least one further poorer heat transfer coefficient than the first is used graduated in the direction of the "best efficiency point" 1307, e.g., in the case of cooling, the coldest region of the cooling plate 106 (conversely, in the case of heating, the warmest region of the "heating plate"). In this manner the temperature difference on the surface of the cooling plate 106 and thus the temperature difference between the battery cells 501, 502, 503 of an entire battery can be reduced.

Figure 15:
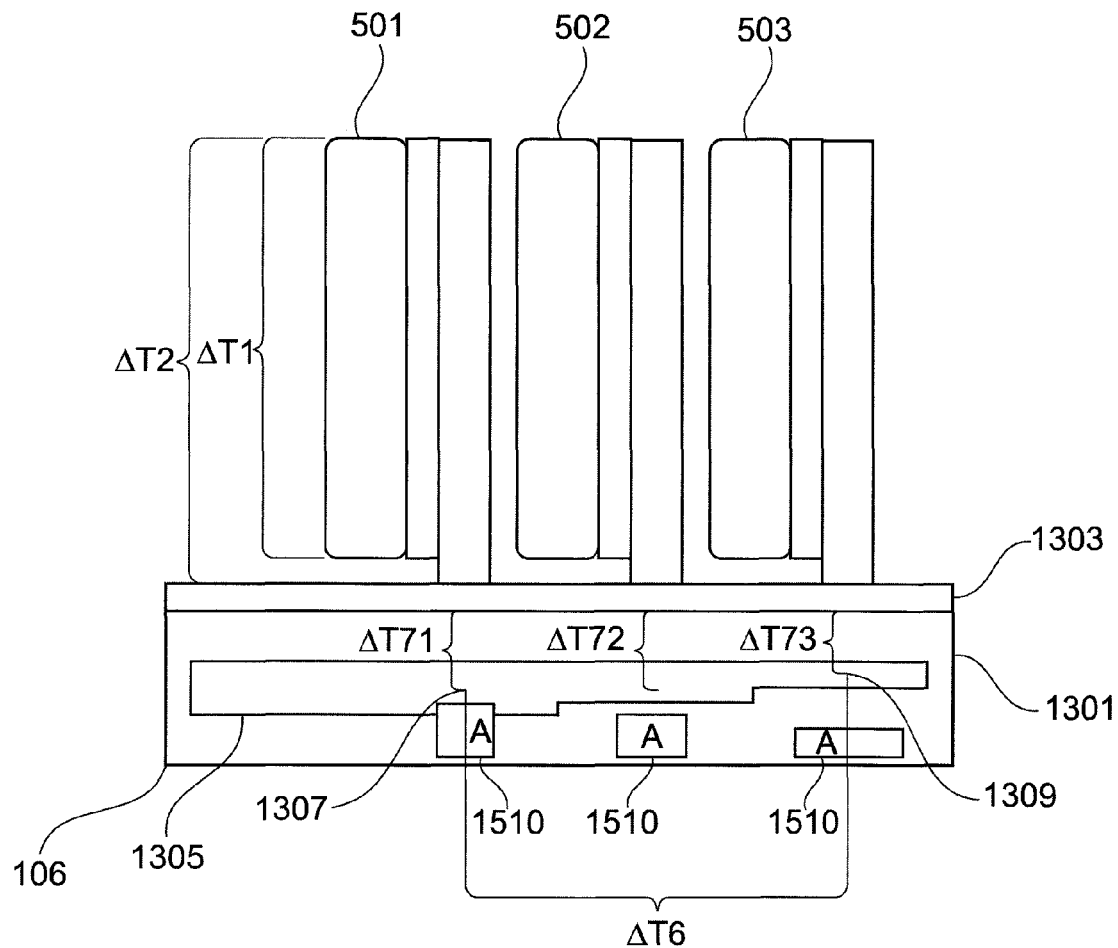

FIG. 15 shows an energy storage device with a device for the thermal connection of a fluid to a cooling plate 106, which renders possible a variable heat transfer between the fluid and the cooling plate. The variable heat transfer can be realized by different alpha values, e.g., different channel shapes.

In contrast to the exemplary embodiment shown in FIG. 14, the channel according to this exemplary embodiment has different channel shapes 1510 in the individual regions.

The heat transfer coefficient "α" is dependent among other things on the channel geometry. According to this exemplary embodiment, the heat transfer is suitably influenced by a change in the channel geometry, e.g., the height/side ratio of the flow cross section.

Figure 16:
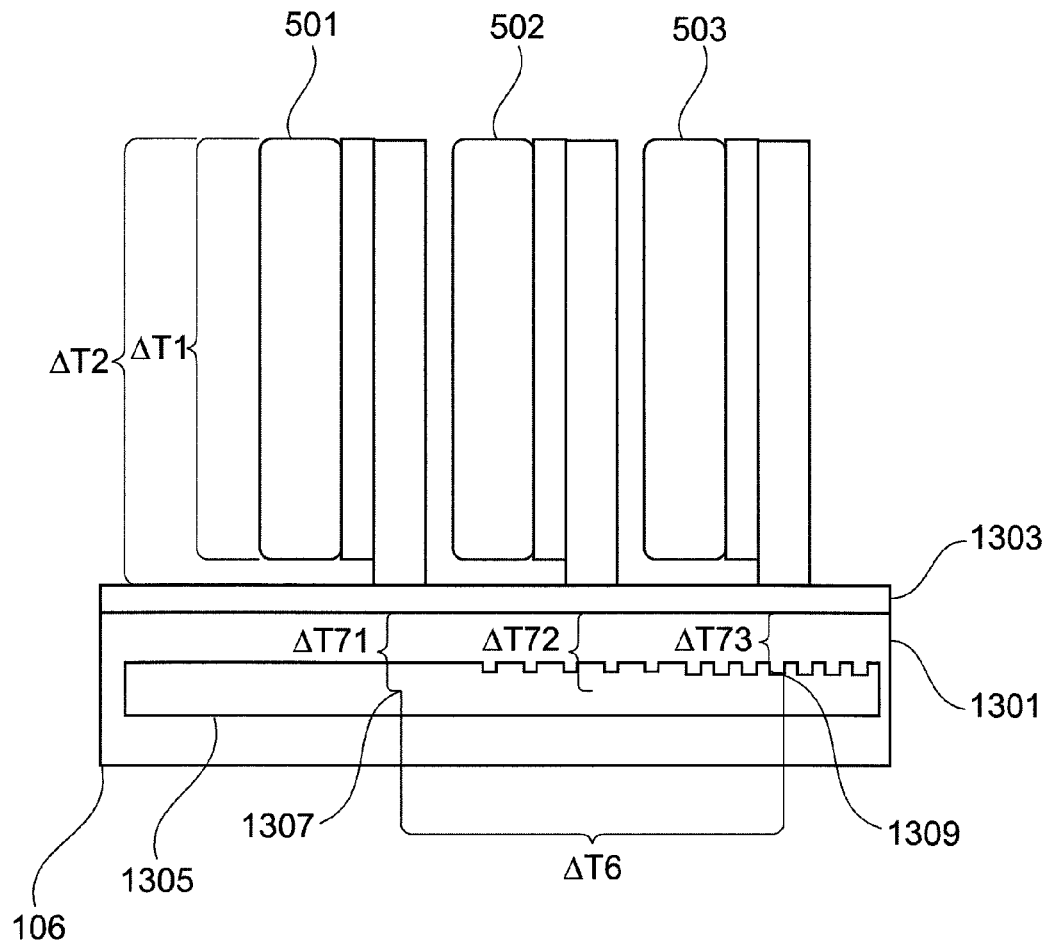

FIG. 16 shows an energy storage device with a device for the thermal connection of a fluid to a cooling plate 106, which renders possible a variable heat transfer between the fluid and the cooling plate. The variable heat transfer can be realized by different alpha values, e.g., different wall roughnesses.

In contrast to the exemplary embodiment shown in FIG. 13, the channel 1305 according to this exemplary embodiment has different wall roughnesses in the individual regions. The wall roughness thus increases in the direction of the worst efficiency point 1309. The first heat transfer property and the further heat transfer property can thus be characterized by different surface structures of an inner wall of the cooling channel 1305 in the first region and the at least one further region.

Furthermore, the heat transfer coefficient "α" depends among other things on the channel wall roughness or flow resistances. According to this exemplary embodiment, it is therefore also proposed to suitably influence the heat transfer by changing the channel wall roughness or other flow resistances, such as e.g., obstructions, cross section steps, deflections etc.

Figure 17:
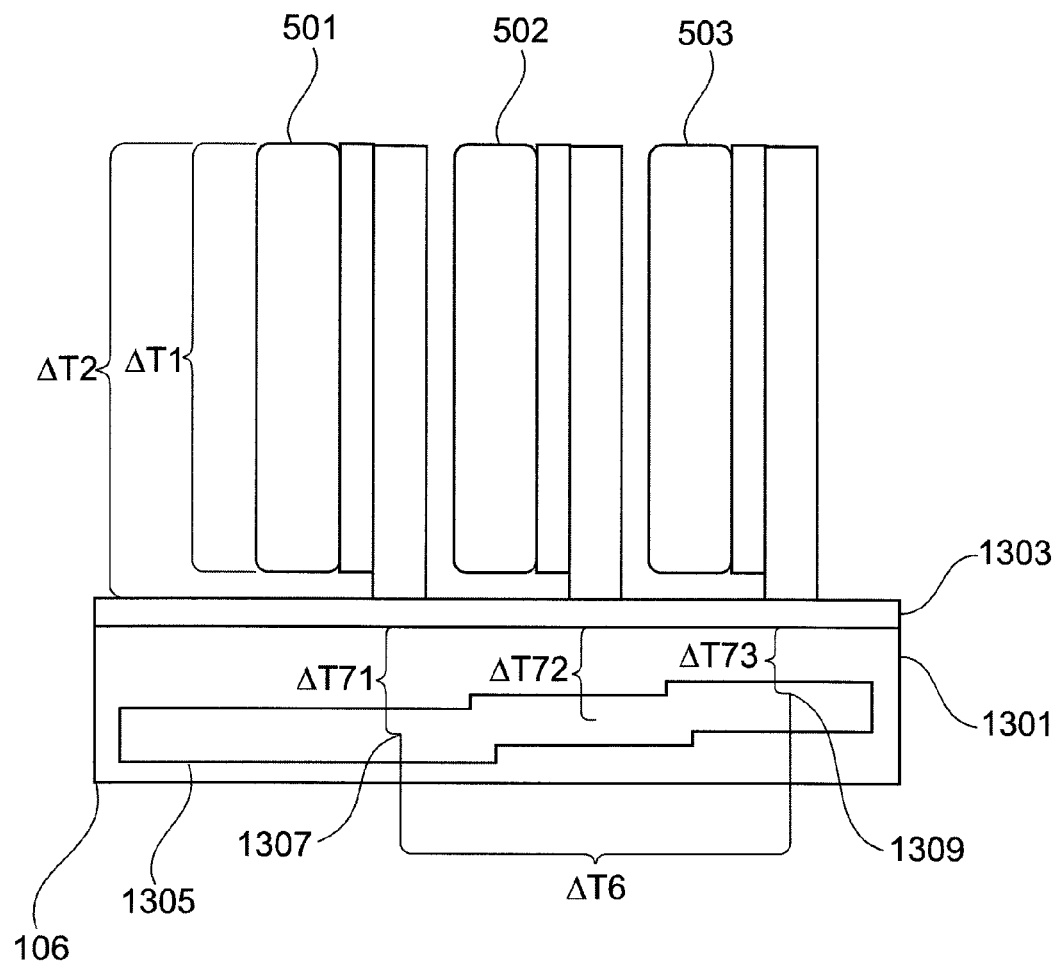

FIG. 17 shows an energy storage device with a device for the thermal connection of a fluid to a cooling plate 106, which renders possible a variable heat transfer between the fluid and the surface of the cooling plate. The variable heat transfer can be realized by differently sized heat-conducting layer thicknesses, e.g., channel depths.

In contrast to the exemplary embodiment shown in FIG. 13, the channel 1305 according to this exemplary embodiment has different distances from the thermally conductive film 1303 in the individual regions. Thus the distance is reduced in a stepwise manner in the direction of the worst efficiency point 1309. The first heat transfer property and the further heat transfer property can thus be characterized by different distances of the first region and the at least one further region from the heat transfer surface.

The variable heat transfer can thus be achieved, e.g. by changing the "A" value. It is therefore proposed to insert differently sized heat transfer surfaces and heat conduction lengths, e.g., by the use of different channel geometries, of narrow or broad spacing of the fluid channels, shown in FIG. 18, position of the fluid channels close to the surface or far from the surface, shown in FIG. 17, the use of ribs, shown, in FIG. 19, turbulence plates, turbulence wires etc. between the fluid and the cooling plate. So that the largest possible heat transfer surface between the fluid and the cooling plate is available at the worst efficiency point 1309 (e.g., the warmest region of the cooling plate in the case of cooling—conversely, in the case of heating, the coldest region of the "heating plate"). At least one other, preferably smaller, heat transfer surface is used graduated in the direction of the "best efficiency point" of the cooling plate (in the case of cooling, the coldest region of the cooling plate, conversely, in the case of heating, the warmest region of the "heating plate"), whereby the heat transfer is locally diminished.

Figure 18:
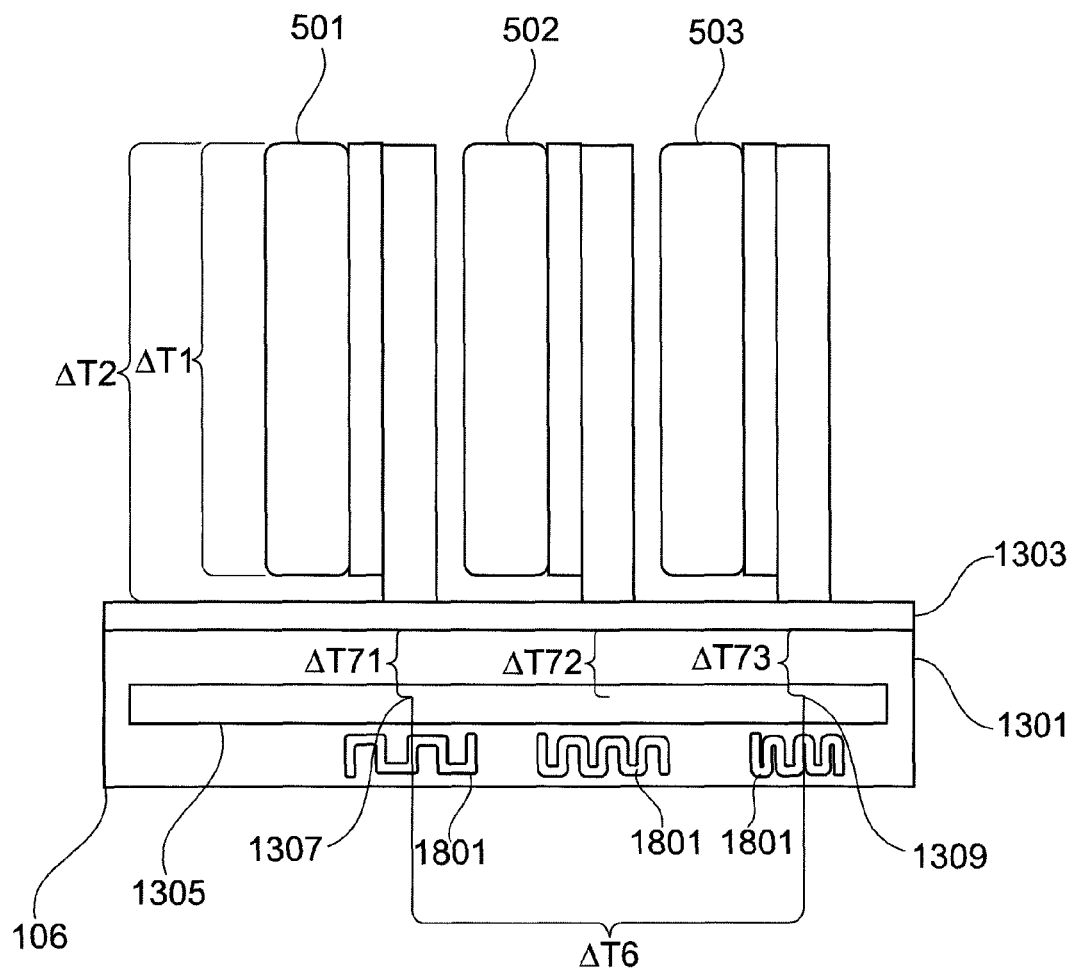

FIG. 18 shows an energy storage device with a device for the thermal connection of a fluid to a cooling plate 106, which renders possible a variable heat transfer between the fluid and the cooling plate. The variable heat transfer can be realized by differently sized heat-transferring surfaces, e.g., channel spacing.

In contrast to the exemplary embodiment shown in FIG. 17, the channel 1305 according to this exemplary embodiment has different channel structures 1801 in the individual regions. The distance between partial sections of individual curves of the channel 1305 is thus reduced in the direction of the worst efficiency point 1309. The first heat transfer property and the further heat transfer property can thus be characterized by different distances of partial pieces of the cooling channel in the first region and the at least one further region.

Figure 19:
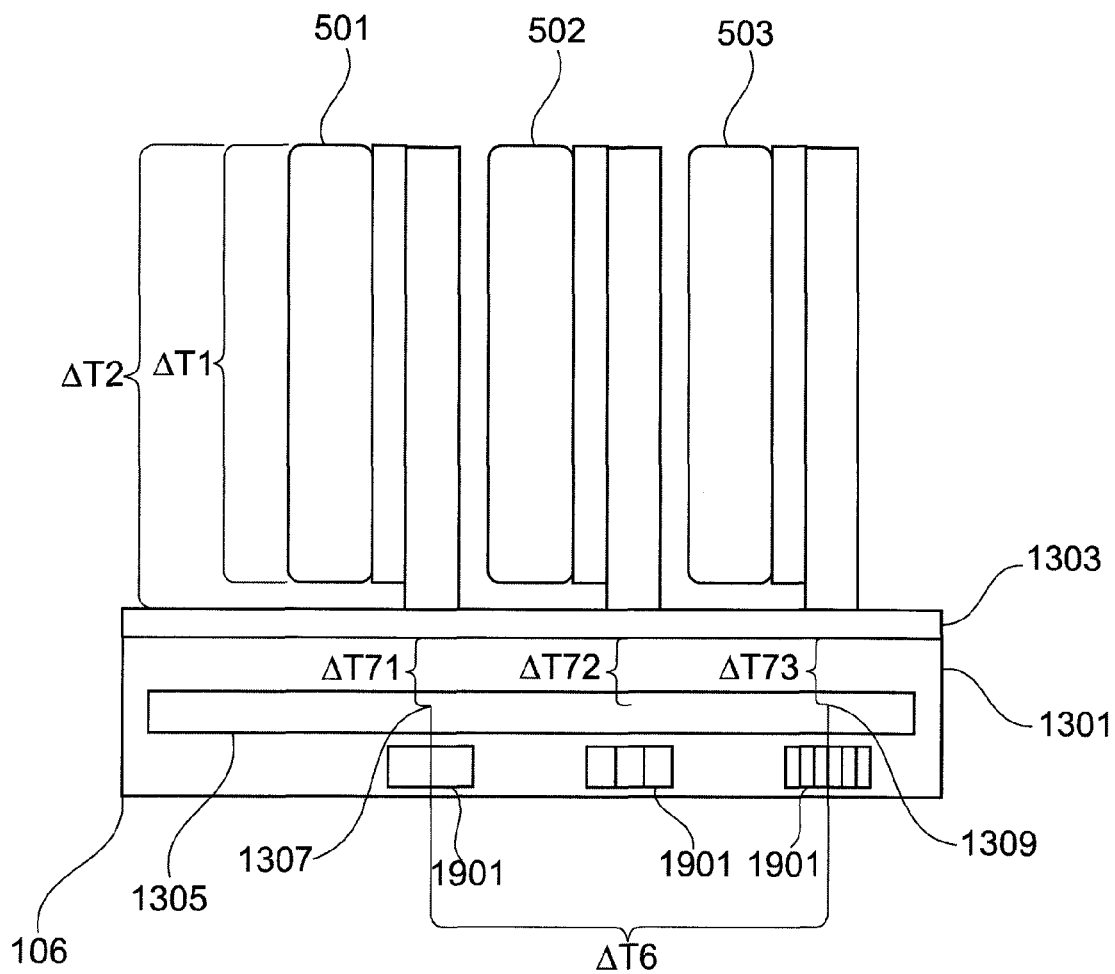

FIG. 19 shows an energy storage device with a device for the thermal connection of a fluid to a cooling plate 106, which renders possible a variable heat transfer between the fluid and the cooling plate. The variable heat transfer can be realized by differently sized heat-transferring surfaces, e.g., with ribs in the channel.

In contrast to the exemplary embodiment shown in FIG. 18, the channel 1305 according to this exemplary embodiment has different channel cross sections 1901 in the individual regions. The first heat transfer property and the further heat transfer property can thus be characterized by differently sized heat-transferring surfaces arranged inside the cooling channel in the first region and the at least one further region.

Figure 20:
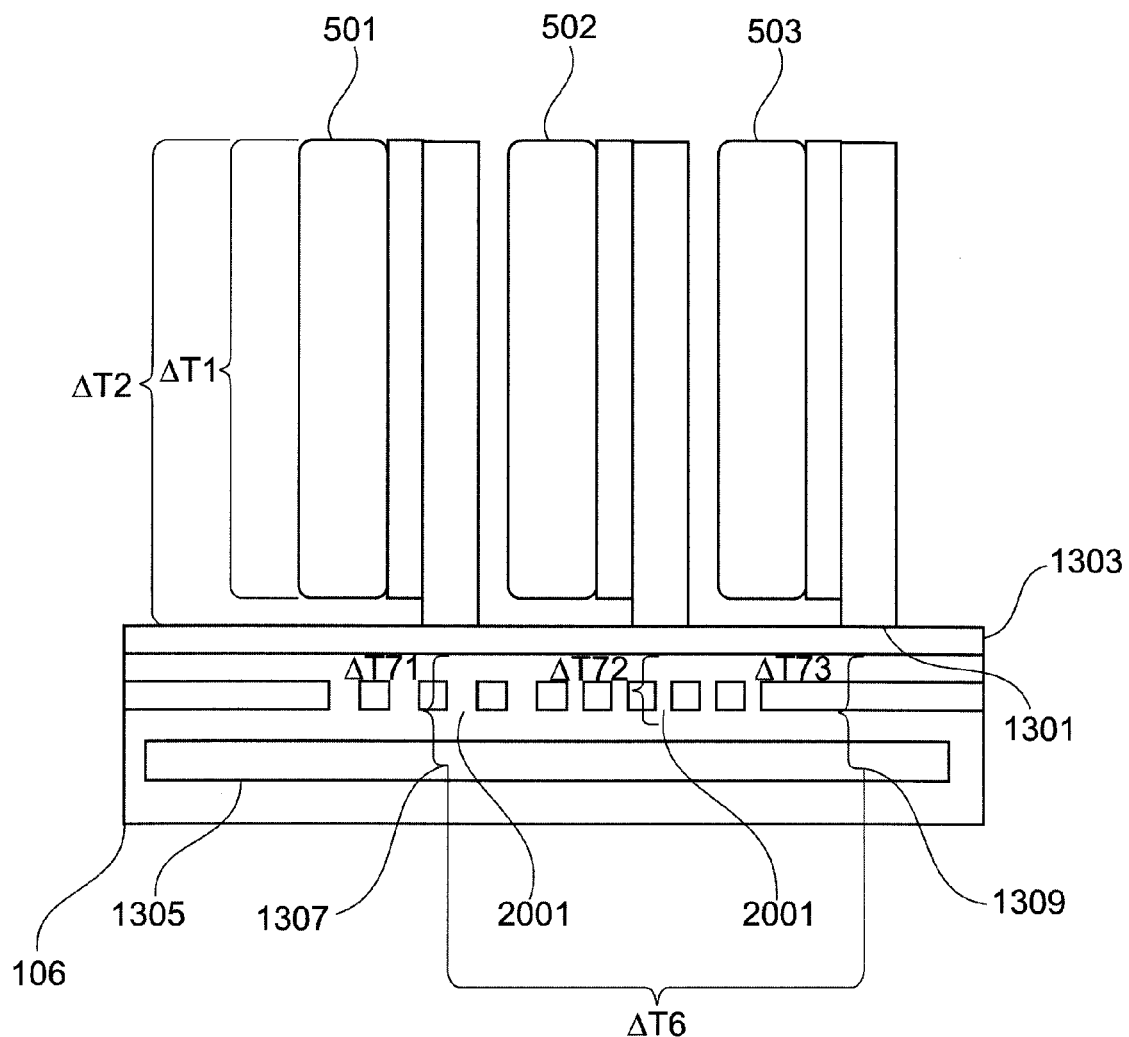

FIG. 20 shows an energy storage device with a device for the thermal connection of a fluid to a cooling plate 106, which renders possible a variable heat transfer between the fluid and the surface of the cooling plate. The variable heat transfer can be realized by differently sized heat-transferring surfaces, e.g., by recesses.

In contrast to the exemplary embodiment shown in FIG. 19, one region of the cooling plate 106 between the layer 1303 and the channel 1305 according to this exemplary embodiment is provided with recesses 2001. The recesses 2001 have different sizes in the individual regions. The cooling plate 106 can be composed of several layers, for example and have a cooling, e.g., with interior channels 1305. The recesses 2001 can be arranged in one of the layers of the cooling plate 106. Thus the first heat-conducting property and the further heat-conducting property can be characterized by differently sized recesses 2001 between the first region of the cooling channel 1305 and the heat-transferring surface and the at least one further region of the cooling channel 1305 and the heat-transferring surface.

Figure 21:
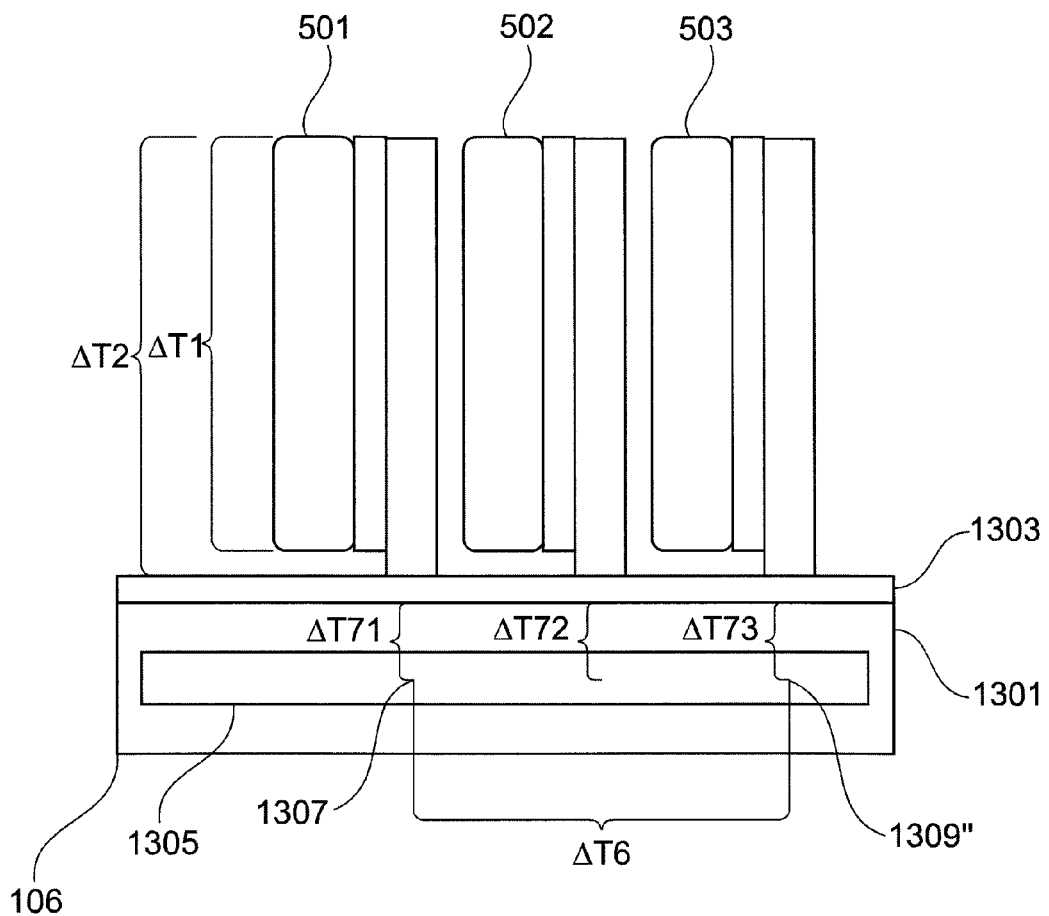

FIG. 21 shows an energy storage device with a device for the thermal connection of a fluid to a cooling plate 106, which renders possible a heat transfer between the fluid and the cooling plate. The variable heat transfer can be realized by different ΔT values between the fluid and the cooling plate 106.

In contrast to the exemplary embodiment shown in FIG. 13, the channel 1305 according to this exemplary embodiment has different fluid feeds in the individual regions. Thus the best efficiency point 1307 can represent a return flow and the worst efficiency point 1309 can represent an inflow of the fluid. Thus the first heat transfer property and the further heat transfer property can be characterized by different temperatures of the fluid in the first region and the at least one further region.

The variable heat transfer can thus be achieved e.g., through a change of the "ΔT" value. Through the heat exchange between the fluid and the cooling plate 106, the average temperature of the fluid in flowing through the cooling plate 106 and thus the driving temperature difference ΔT between the fluid and the cooling plate 106 is changed. It is therefore proposed to select the path of the fluid in a suitable manner, e.g., by a suitable channel structure, channel placement, so that the coldest possible fluid (e.g., the inflow) is available at the worst efficiency point 1309 (e.g., in the case of cooling, the warmest region of the cooling plate). Already heated fluid (e.g., the return flow) is arranged graduated in the direction of the "best efficiency point" 1307 of the cooling plate 106 (in the case of cooling, the coldest region of the cooling plate).

Instead of in a cooling plate 106 with interior channels (e.g., structure of laminated sheets), channels soldered or adhered to a cooling plate 106, e.g., in the form of tubes, e.g., flat tubes, are also conceivable in which the heat transfer is adjusted locally in the same way.

The exemplary embodiments shown in FIGS. 14 through 21 in turn provide the advantage that the temperature differences between the cells can be reduced in a desired manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An energy storage device comprising:
   at least one energy storage;
   a cooling plate; and
   at least one device for thermal connection arranged between the at least one energy storage and the cooling plate,
   the at least one device for thermal connection comprising:
   a contact element with a heat transfer surface for providing the thermal connection, the contact element including a film and a cooling fin, the film having a first region with a first heat-conducting property and at least one further region with a further heat-conducting property, the first region and the at least one further region being arranged next to one another along the heat transfer surface,
   wherein the first heat-conducting property is different from the further heat-conducting property,
   wherein the first heat-conducting property and the further heat-conducting property are characterized by different contact resistances of the first region and the at least one further region,
   wherein the first region is formed of a different material from the at least one further region, so as to provide the different contact resistances, and
   wherein the first region and the at least one further region are both arranged in a same plane, the same plane being parallel to the heat transfer surface.

2. The energy storage device according to claim 1, wherein different contact resistances of the first region and the at least one further region are determined by different bearing pressures on the first region and the at least one further region.

3. The energy storage device according to claim 1, wherein the first heat-conducting property and the further heat-conducting property are characterized by different contact surfaces in the first region and the at least one further region.

4. The energy storage device according to claim 3, wherein the different contact surfaces are determined by recesses in the contact element.

5. The energy storage device according to claim 3, wherein the different contact surfaces are determined by recesses in the cooling plate.

6. The energy storage device according to claim 1, wherein the first heat-conducting property and the further heat-conducting property comprise different cross sections of the first region and the at least one further region.

7. The energy storage device according to claim 1, wherein the contact element is in direct contact with the at least one energy storage and wherein the first region has a greater heat conductance than a heat conductance of the at least one further region.

8. The energy storage device according to claim 1, wherein the cooling fin extends parallel to the at least one energy storage and perpendicular to the cooling plate.

9. The energy storage device according to claim 1, wherein the first region and the at least one further region are provided in the film.

10. The energy storage device according to claim 1, wherein the first region is arranged directly adjacent to the at least one further region along the heat transfer surface.

11. The device energy storage according to claim 1, wherein the first region and the at least one further region are positioned between the heat transfer surface and the cooling fin.

* * * * *

UNITED STATES PATENT AND TRADEMARK OFFICE
CERTIFICATE OF CORRECTION

PATENT NO. : 9,457,645 B2  
APPLICATION NO. : 13/250454  
DATED : October 4, 2016  
INVENTOR(S) : Hirsch et al.

Page 1 of 1

It is certified that error appears in the above-identified patent and that said Letters Patent is hereby corrected as shown below:

On the Title Page

The Letters Patent shows:

(75) Inventors: Stefan Hirsch, Stuttgart (DE); Achim Wiebelt, Deidesheim (DE); Caroline Schmid, Stuttgart (DE); Tobias Isermeyer, Loewenstein (DE); Marc-Thomas Eisele, München (DE)

The Letters Patent should read:

(75) Inventors: Stefan Hirsch, Stuttgart (DE); Achim Wiebelt, Deidesheim (DE); Caroline Schmid, Stuttgart (DE); Tobias Isermeyer, Stuttgart (DE); Marc-Thomas Eisele, München (DE)

Signed and Sealed this  
Second Day of May, 2017

Michelle K. Lee  
*Director of the United States Patent and Trademark Office*